(12) United States Patent
Negru et al.

(10) Patent No.: US 12,244,227 B2
(45) Date of Patent: Mar. 4, 2025

(54) TRIPLE-PATH POWER INDUCTOR-FLYING CAPACITOR HYBRID POWER CONVERTER

(71) Applicant: Renesas Design (UK) Limited, Bourne End (GB)

(72) Inventors: Sorin Laurentiu Negru, San Jose, CA (US); Sabin Eftimie, Morgan Hill, CA (US)

(73) Assignee: Renesas Design (UK) Limited, Bourne End (GB)

( * ) Notice: Subject to any disclaimer, the term of this patent is extended or adjusted under 35 U.S.C. 154(b) by 212 days.

(21) Appl. No.: 17/961,434

(22) Filed: Oct. 6, 2022

(65) Prior Publication Data

US 2024/0120850 A1    Apr. 11, 2024

(51) Int. Cl.
*H02M 3/07* (2006.01)
*H02J 7/02* (2016.01)
*H02M 1/00* (2006.01)
*H02M 3/00* (2006.01)
*H02M 3/158* (2006.01)

(52) U.S. Cl.
CPC ............... *H02M 3/07* (2013.01); *H02J 7/02* (2013.01); *H02M 1/0095* (2021.05); *H02M 3/01* (2021.05); *H02M 3/158* (2013.01)

(58) Field of Classification Search
CPC ........ H02M 1/0095; H02M 3/01; H02M 3/07; H02M 3/158
See application file for complete search history.

(56) References Cited

U.S. PATENT DOCUMENTS

| 10,218,255 | B1 | 2/2019 | Petersen | |
|---|---|---|---|---|
| 10,298,124 | B2 | 5/2019 | Petersen et al. | |
| 10,756,623 | B1 | 8/2020 | Petersen | |
| 10,790,742 | B1 | 9/2020 | Petersen | |
| 2022/0181967 | A1* | 6/2022 | Petersen | H02M 3/07 |
| 2023/0134427 | A1* | 5/2023 | Liu | H02M 3/07 |
| | | | | 323/271 |
| 2023/0188034 | A1* | 6/2023 | Petersen | H02M 3/07 |
| | | | | 363/60 |
| 2023/0198385 | A1* | 6/2023 | Mercer | H02M 3/07 |
| | | | | 323/271 |
| 2024/0079949 | A1* | 3/2024 | Liu | H02M 1/0095 |

OTHER PUBLICATIONS

T. A. Meynard and H. Foch, "Multi-level conversion: High voltage choppers and voltage-source inverters," in Proc. Power Electron. Specialists Conf., vol. 1, Jul. 1992, pp. 397-403.
D. Reusch., F. Lee, "Three Level Buck Converter with Control and Soft Startup", 2009 IEEE Energy Conversion Congress and Exposition.

(Continued)

*Primary Examiner* — Kyle J Moody
*Assistant Examiner* — Jye-June Lee
(74) *Attorney, Agent, or Firm* — SCULLY, SCOTT, MURPHY & PRESSER, P.C.

(57) ABSTRACT

A power converter including an inductor, a first power switch, a second power switch, a third power switch, a fourth power switch, a sixth power switch, a first flying capacitor, a third flying capacitor, a seventh power switch, an eighth power switch, a ninth power switch, a tenth power switch, a twelfth power switch, a second flying capacitor, and a fourth flying capacitor.

23 Claims, 15 Drawing Sheets

(56) References Cited

OTHER PUBLICATIONS

Y. Huh, S. Hong and G. Cho, "A Hybrid Structure Dual-Path Step-Down Converter With 96.2% Peak Efficiency Using 250-mOhm Large-DCR Inductor," in IEEE Journal of Solid-State Circuits, vol. 54, No. 4, pp. 959-967, Apr. 2019, doi: 10.1109/JSSC.2018.2882526.
K. Hata, Y. Yamauchi, T. Sai, T. Sakurai and M. Takamiya, "48V-to-12V Dual-Path Hybrid DC-DC Converter," 2020 EEE Applied Power Electronics Conference and Exposition (APEC), 2020, pp. 2279-2284, doi: 10.1109/APEC39645.2020.9124077.

* cited by examiner

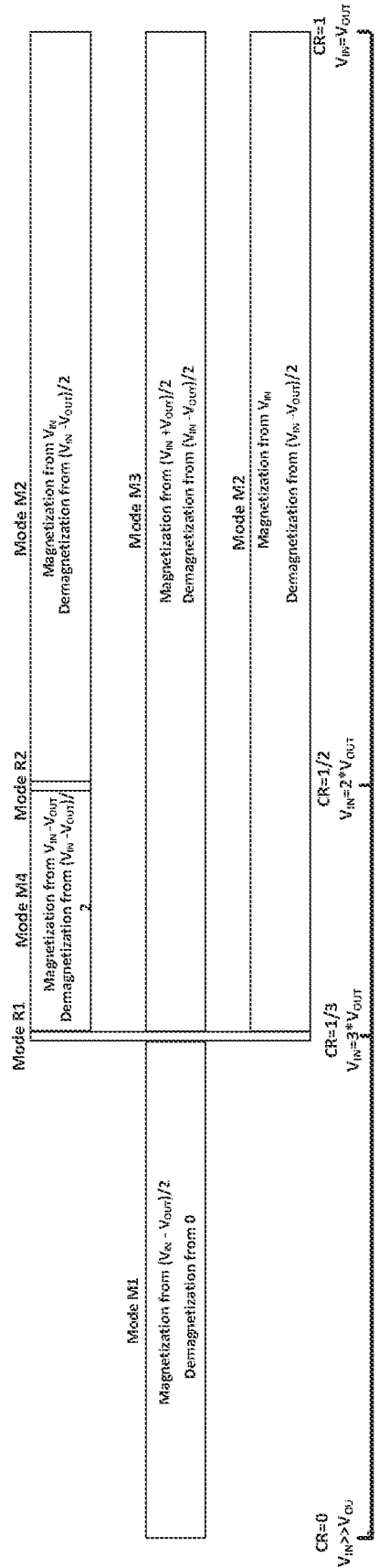

TRIPLE-PATH POWER INDUCTOR-FLYING CAPACITOR HYBRID POWER CONVERTER

BACKGROUND

Technical Field

The present document relates to power converters. In particular, the present document relates to increasing the power efficiency of a power converter, notably for portable applications, such as smartphones, tablets, laptops, wearables, etc.

Description of Related Art

A high voltage charger for a portable application may have multiple inputs, e.g., from an USB/Adaptor (Wired) or from a (Wireless) Pad. The charger may be configured to perform bidirectional conversion. The reverse boost function may be used when the input voltage VIN and the output voltage VOUT (which may also be referred to as the battery voltage VBATT) are swapped and when the charger generates a relatively high voltage at the VIN pin (treated as an output power) which is derived from the VBATT pin (treated as an input power). In this mode, it may be used as a 'High Voltage Charger' for a second battery and/or device.

By incorporating more and more functions, a portable device becomes more and more power hungry. In this context, a higher capacity battery may be used, so that the device can last longer between charging events. Furthermore, the user experience may be improved by shorter charging cycles. Both these directions require faster charging by increasing the battery charging power, e.g., from 5 W to 20 W and to 50 W-100 W in the near future.

Different directions may be taken to address the above-mentioned technical problems:
  Connecting multiple batteries in parallel in order to increase the power capacity available within a device;
  Increasing the input voltage used to charge the battery, while keeping the input current through the adaptor cable at a reasonable level as low as 2A, thereby providing a higher charging power (for example 20V input voltage at a 2A cable current may provide 40 W of power to the battery system). Most of the devices today are targeting maximum 3A on the input connector, as this is defined by the lower cost USB-C standard.
  Increasing the efficiency of the DC/DC converter used as charger in order to keep the overall power loss inside the device at a reasonable level while increasing the charging power for faster charging.

The present document addresses the technical problem of providing a particularly efficient high voltage charger for portable applications.

SUMMARY

According to an aspect, a power converter is described (for use within a charger), which comprises
  an inductor, which is arranged between a SW node and an output node of the power converter;
  a first power switch having a first node coupled to an input node of the power converter, and having a second node;
  a second power switch having a first node coupled to the second node of the first power switch, and having a second node;
  a third power switch having a first node, and having a second node coupled to the output node;
  a fourth power switch having a first node coupled to the SW node and having a second node;
  a sixth power switch having a first node coupled to the second node of the fourth power switch, and having a second node coupled to a reference node of the power converter;
  a first flying capacitor arranged between the second node of the first switch and the first node of the sixth switch;
  a third flying capacitor arranged between the first node of the third switch and the second node of the fourth switch;
  a seventh power switch having a first node coupled to the input node of the power converter, and having a second node;
  an eighth power switch having a first node coupled to the second node of the seventh power switch, and having a second node;
  a ninth power switch having a first node, and having a second node coupled to the output node;
  a tenth power switch having a first node coupled to the SW node and having a second node;
  a twelfth power switch having a first node coupled to the second node of the tenth power switch, and having a second node coupled to the reference node of the power converter;
  a second flying capacitor arranged between the second node of the seventh switch and the first node of the twelfth switch; and a fourth flying capacitor arranged between the first node of the ninth switch and the second node of the tenth switch.

The second node of the second switch is coupled to the first node of the ninth switch, and the second node of the eighth switch is coupled to the first node of the third switch.

According to another aspect, a method for operation of a power converter is described, wherein the power converter is designed as outlined in the present document. The method comprises operating the power converter within a first mode of operation to provide a conversion of an input voltage at the input node to an output voltage at the output node in accordance to a conversion ratio. The first mode of operation comprises a sequence of different states of the power converter for an, notably for each, operation cycle of the first mode of operation.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE FIGURES

The invention is explained below in an exemplary manner with reference to the accompanying drawings, wherein:

FIG. 6 provides an overview of different modes of operation and the corresponding ranges of the conversion ratio.

DETAILED DESCRIPTION

As outlined above, the present document is directed at providing a particularly efficient power converter for portable applications. In particular, the present document is directed at reducing the voltage ratings for flying capacitors and power switches (notably field effect transistors, FETs) and at reducing the bill of material and the PCB (printed circuit board) space. Furthermore, it is an objective to increase the safety functionality. The power converter is preferably configured to keep a constant setup for voltages on the flying capacitors over the entire range of VIN, thereby making the control of the power converter easier.

It is an objective to generate high efficiency power conversion, in particular for
- a relatively low conversion ratio (CR<¼ or CR<⅓);
- a relatively high input voltage (16V-24V);
- a typical output voltage for charging a single cell Li-ion battery (e.g., VOUT=4.5V);
- a low to medium load current. This feature makes the power converter suitable for a complete charger solution as a compact single chip design. The power converter may be used to replace a combination of a capacitive divider and an inductive regulated converter. The charger preferably works at high current (CC mode) as a Charge Pump and at low charging current (CV mode) as a step-down voltage regulator.
- scalability towards higher input voltages and/or higher load currents. A high input voltage typically requires more switches in series and more flying capacitors holding constant voltages for reducing the voltage stress on the power switches. A high load current typically needs more phases to be added to the same output node. The symmetrical schematic which is described in the present documents allows this to be done easily.

Figure 1A:
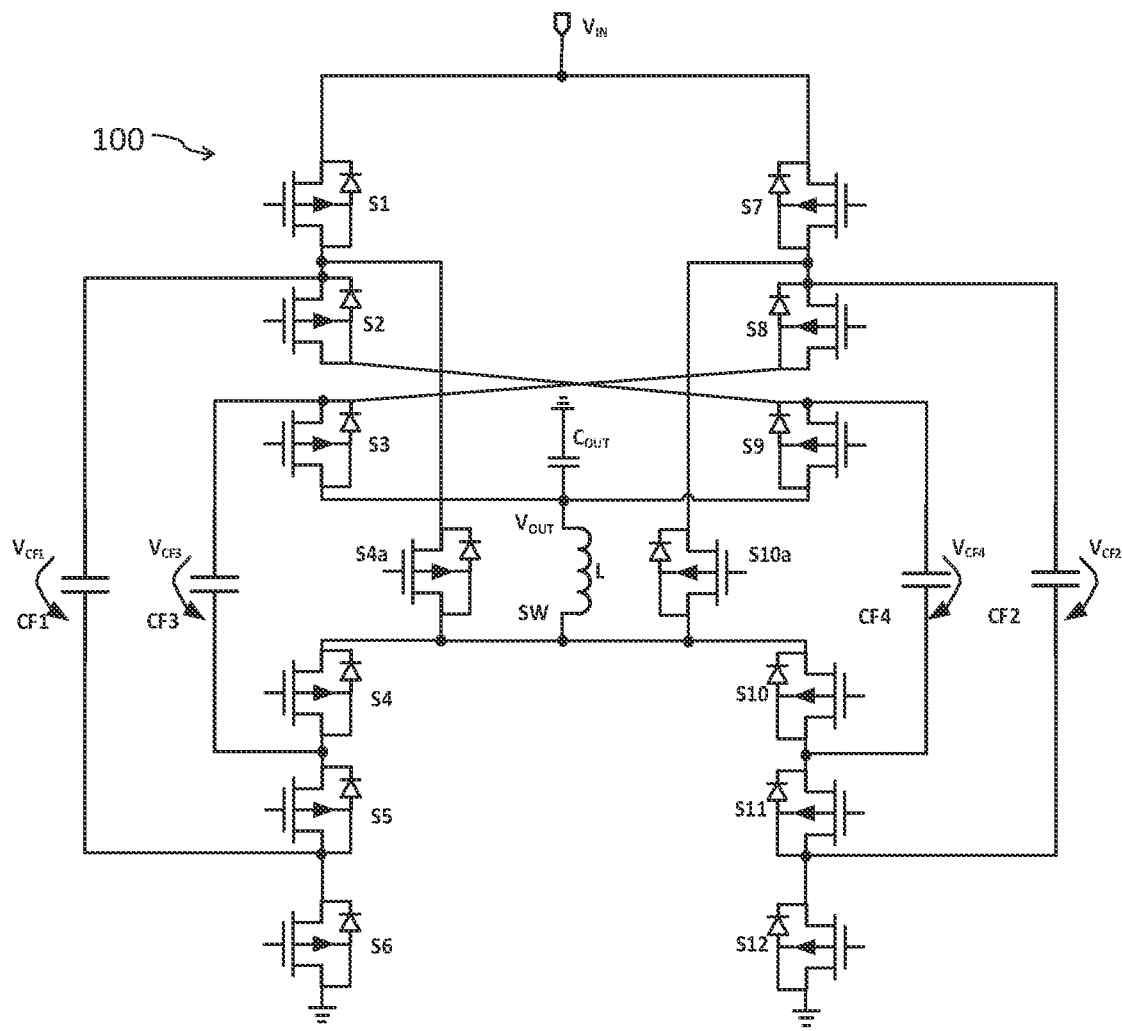
FIGS. 1A to 1D illustrate different variants of an example power converter (for use as a charger)

FIG. 1A illustrates the architecture of the power stage of a dual-phase, triple-path, hybrid power converter 100. The power converter 100 is a dual-phase converter because there are two identical strings of power switches (S1-S6 and S7-S12) which are working in interleaved mode and which are supplying current to the VOUT node. The first string is formed by 6 power switches organized in two sections, the high side switches S1, S2, S3 connected between the input voltage node (VIN) and the output voltage node (VOUT) of the converter 100, and the low side switches S4, S5, S6 connected between the inductor switching node (SW) and the ground node (GND).

In a similar manner, the second string is formed by 6 power switches organized in two sections, the high Side switches S7, S8, S9 connected between the input voltage node (VIN) and the output voltage node (VOUT) of the converter 100, and the low side switches S10, S11, S12 connected between the inductor switching node (SW) and the ground node (GND).

Furthermore, there is a coupling connection between the two strings. In particular, S2 from the first string is connected to S9 from the second string, and S3 from the first string is connected to S8 of the second string.

Figure 2A:
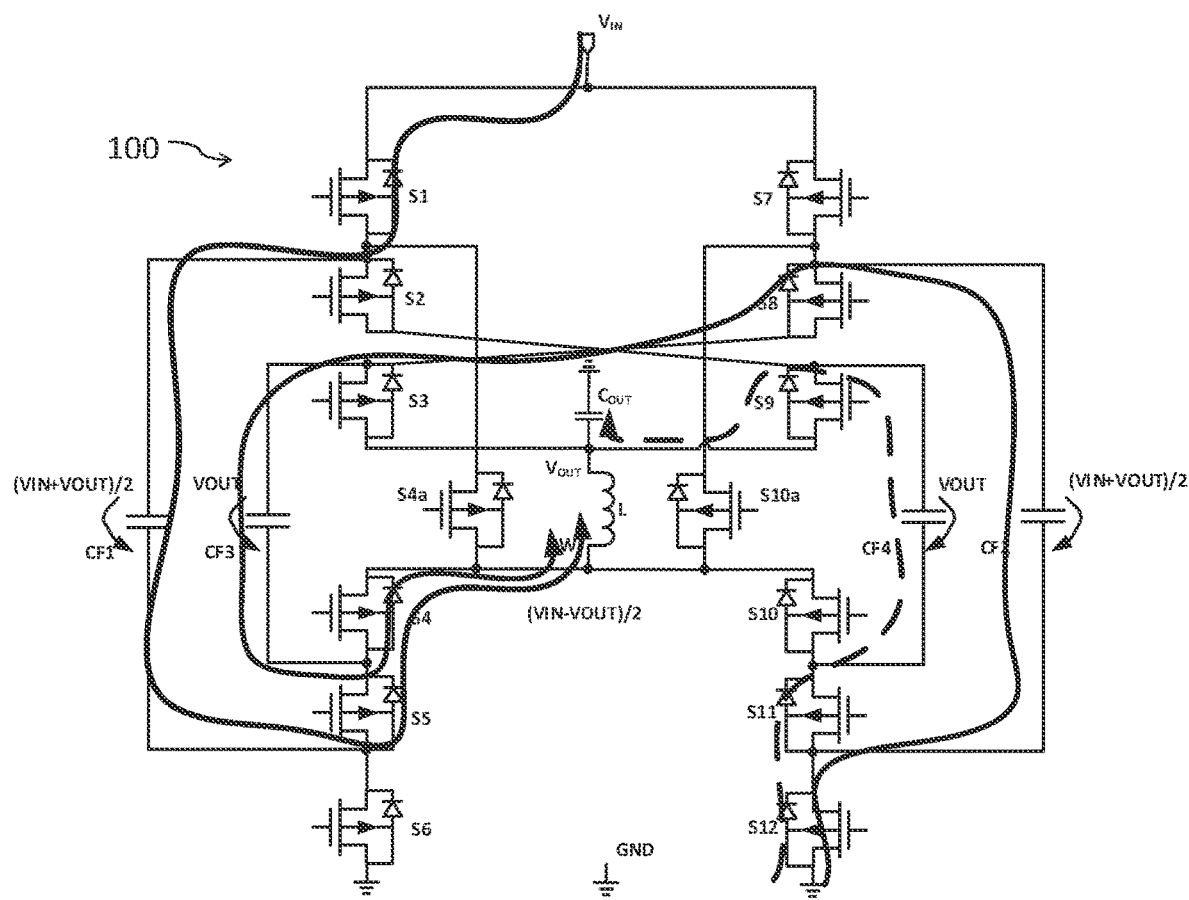
FIGS. 2A to 2C show different states of the power converter of FIGS. 1A to 1D, including different current paths (using arrows) which are provided within the respective states, which may be provided by turning different power switches of the power converter ON or OFF.
Figure 2B:
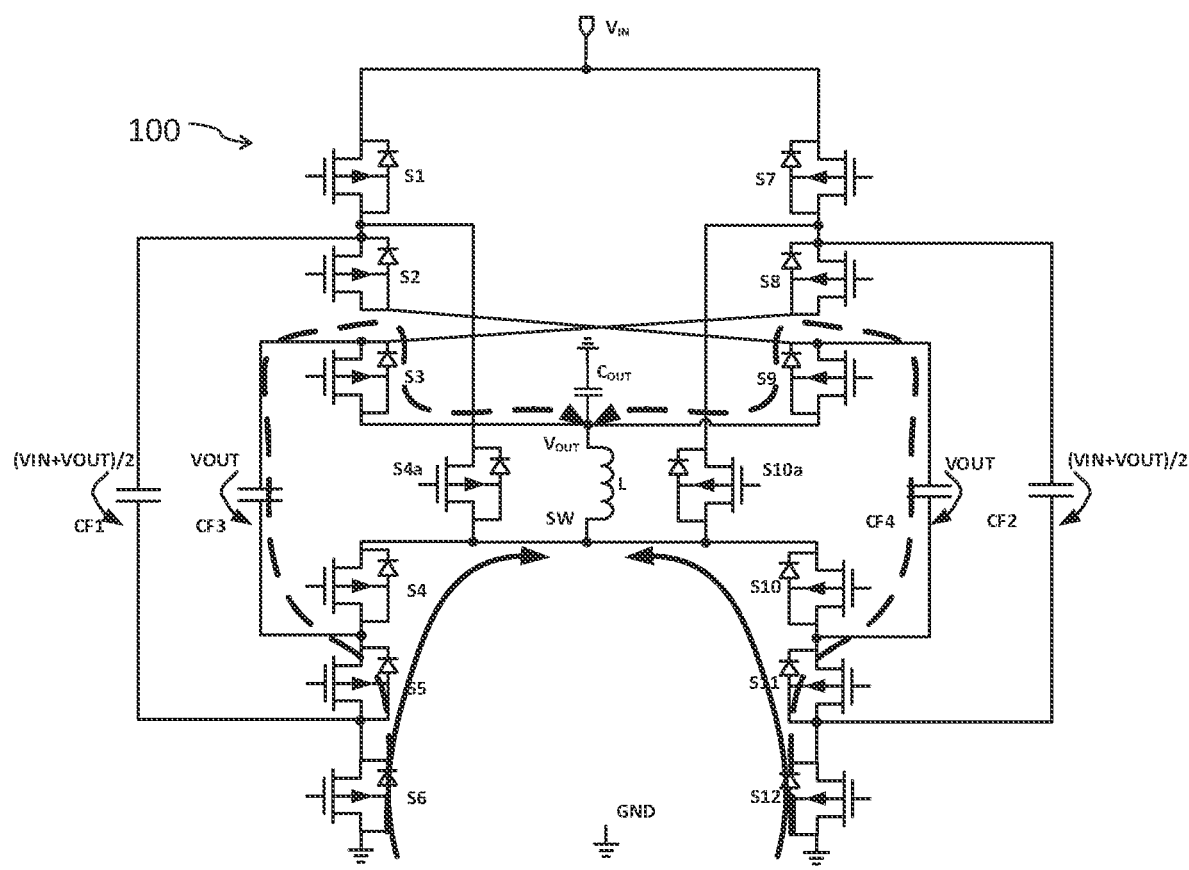
Figure 2C:
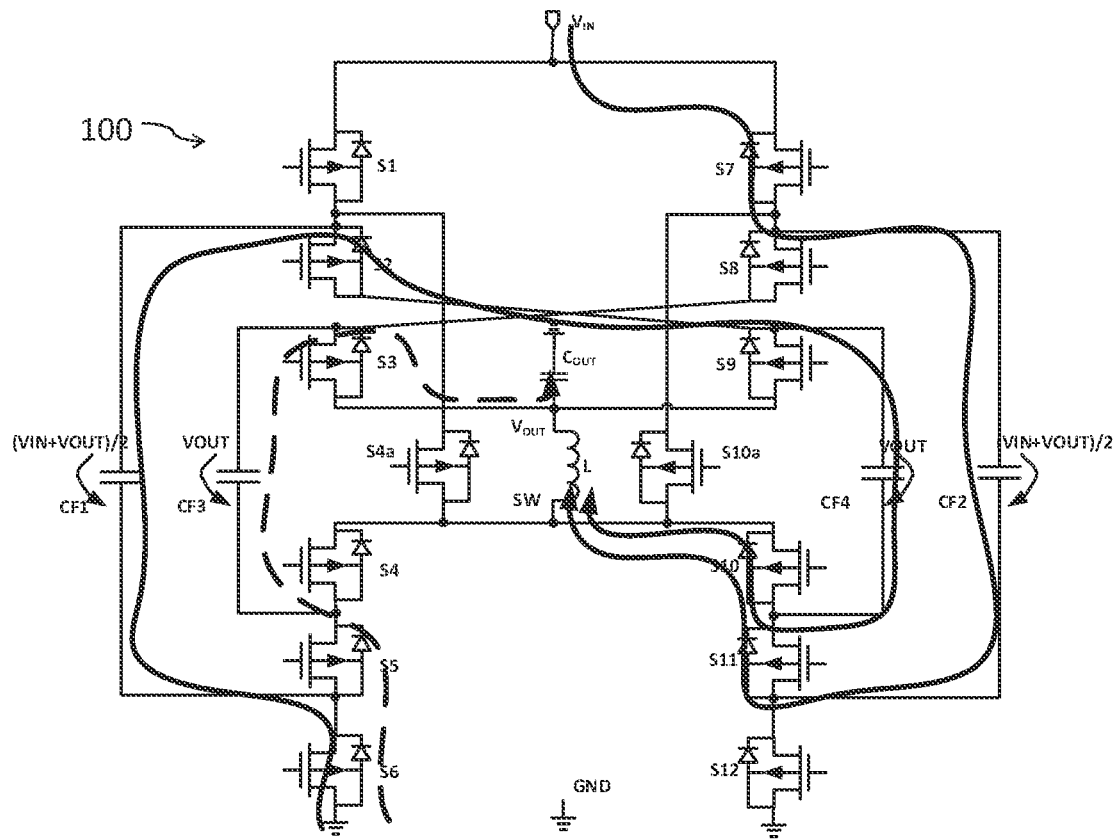
Figure 5A:
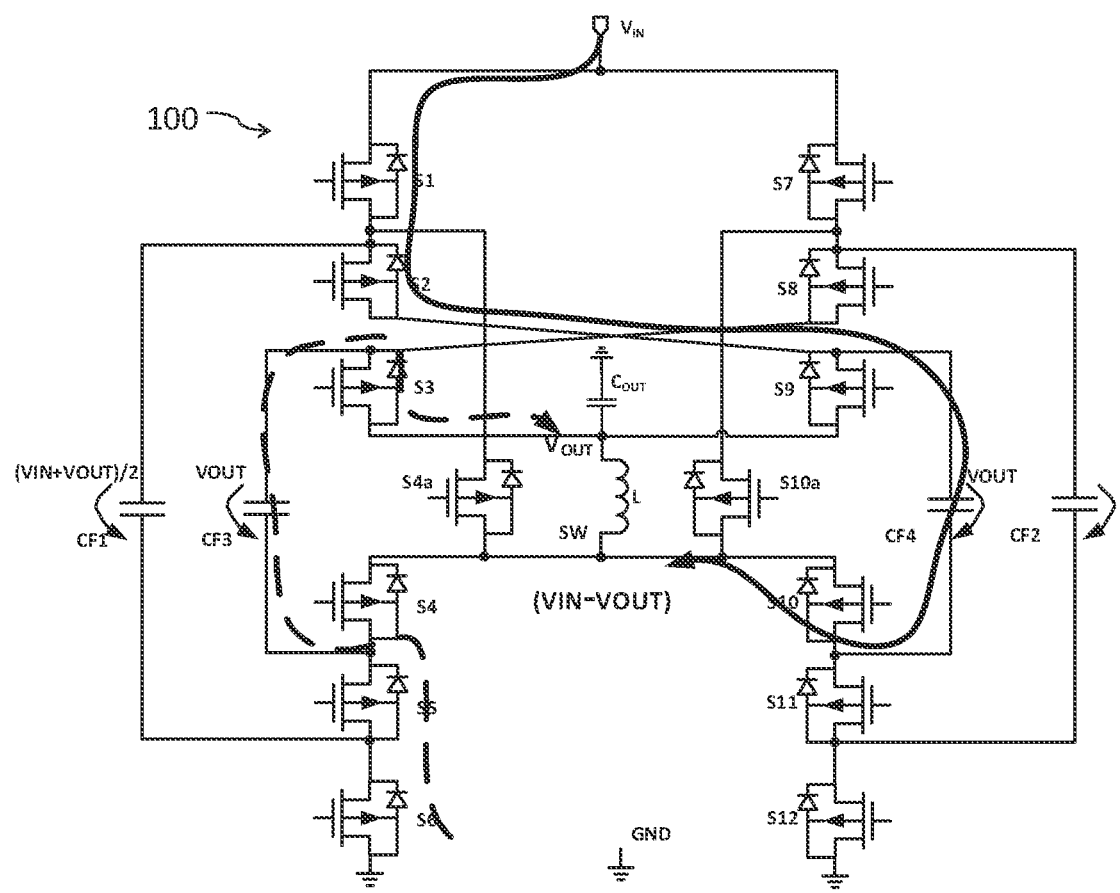
Figure 5B:
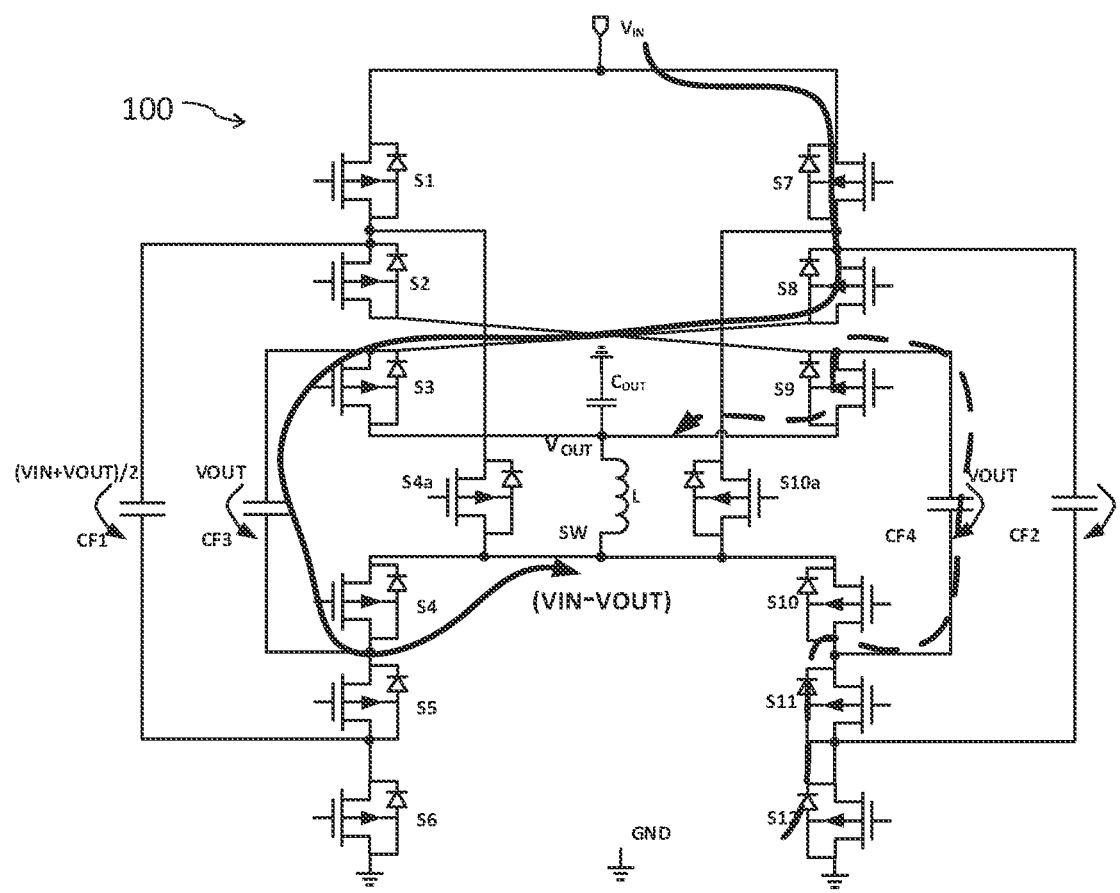

The power converter 100 of FIG. 1A is a triple-path converter, because the two strings provide current to the load on three different paths: two paths through the inductor L and one path direct to VOUT, through the flying capacitors CF1-CF4. This may be achieved in various different states of the power converter 100 (such as shown in FIGS. 2A, 2B and 2C). It should be noted, that the power converter 100 may be operated within a state which comprises less than three paths (as shown e.g., in FIGS. 3A and 5, which only comprise two paths).

The power converter 100 of FIG. 1A is a hybrid converter, because it uses both inductor and multiple capacitors as energy storage elements, in order to make conversion of VIN to VOUT.

Inductor L is connected between the switch node (SW) and the output node (VOUT) of the regulator 100. However, as discussed before, the SW node and the VOUT node are inversed with regards to the high side and the low side switches of the regulator 100. In particular, for the regulator 100 shown in FIG. 1A, the SW node is the top node of the low side switches S4, S5, S6, S10, S11, S11 and the VOUT node is the lower node of the high side switches S1, S2, S3, S7, S8. S9. This configuration allows keeping the same voltages on the flying capacitors for the entire Vin range. Furthermore, the configuration allows creating a lower voltage rating for flying capacitors.

The flying capacitors CF1-CF4 are interlaced between the power switches, 2 flying capacitors per phase, and 4 flying capacitors in total:
- CF1 is connected between the common node of S1 and S2 and the common node of S5 and S6.
- CF2 is connected between the common node of S7 and S8 and the common node of S11 and S12.
- CF3 is connected between the common node of S3 and S8 and the common node of S4 and S5. It cross-couples the first string and the second string.
- CF4 connected between the common node of S2 and S9 and the common node of S10 and S11. It cross-couples the first string and the second string.

There are two more power switches in the power stage, S4a and S10a, which are related to the converter operation at high conversion ratio (CR). For CR≤0.33, these power switches are not needed. Switches S5 and S11 may be always ON for a main mode of operation of the power converter 100. The switches S5 and S11 are OFF only in state ST7, used only in mode M4 (which is an alternate mode of operation). State ST7 and mode M4 are described at a later stage within this document.

Figure 1B:
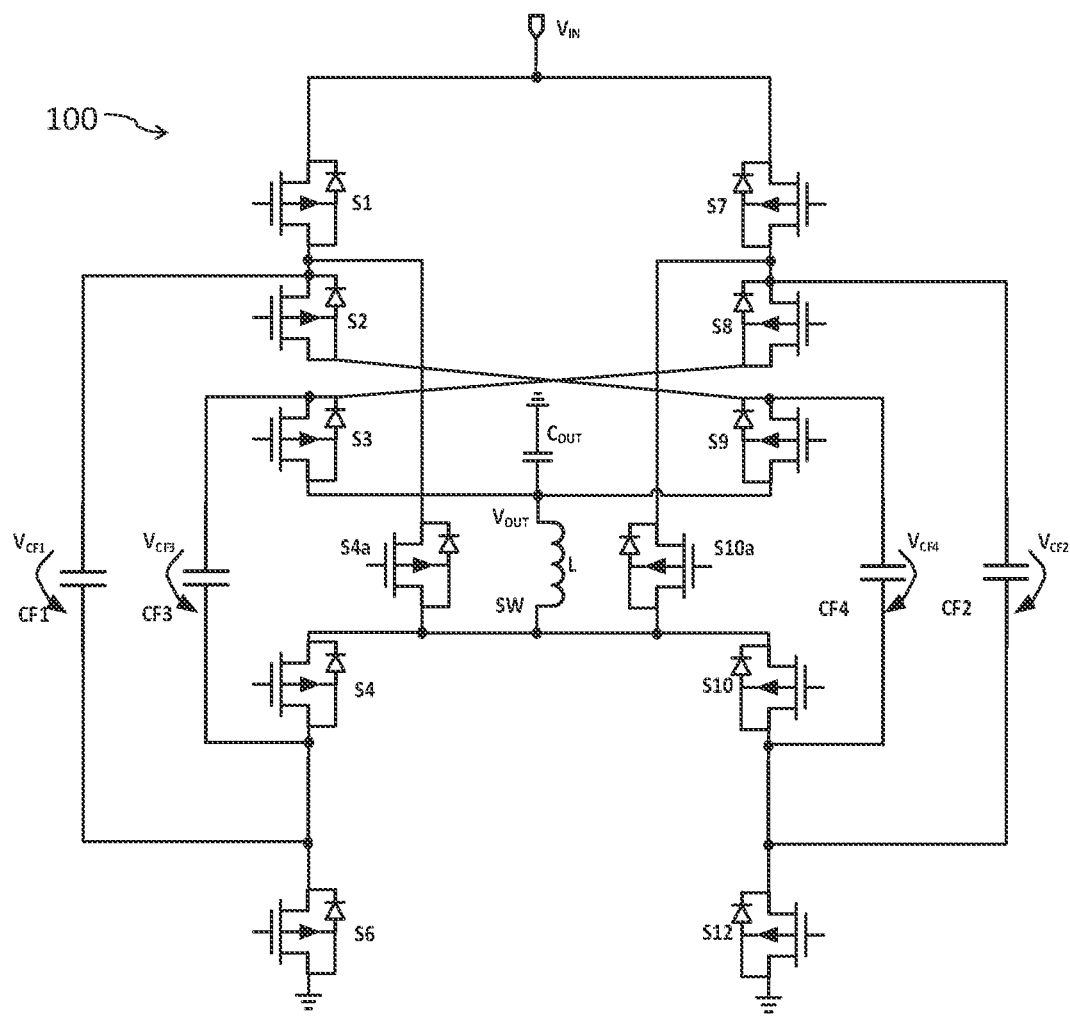

FIG. 1B shows a variant of the power converter 100, which corresponds to the power converter 100 of FIG. 1A with the switches S5 and S11 being removed (and replaced by direct connections of nodes of the switches S4, S6 and S10, S12, respectively). The power converter 100 of FIG. 1B may be used to provide all the states which are described in the present document (apart from state ST7). The power converter 100 of FIG. 1B may be used for a full range of the input voltages VIN and/or for a full range of conversion ratios, 0<CR<1. Furthermore, the power converter 100 of FIG. 1B may be used for providing the sequences of operational modes SM1 and SM2 (which are described in the present document).

Figure 1C:
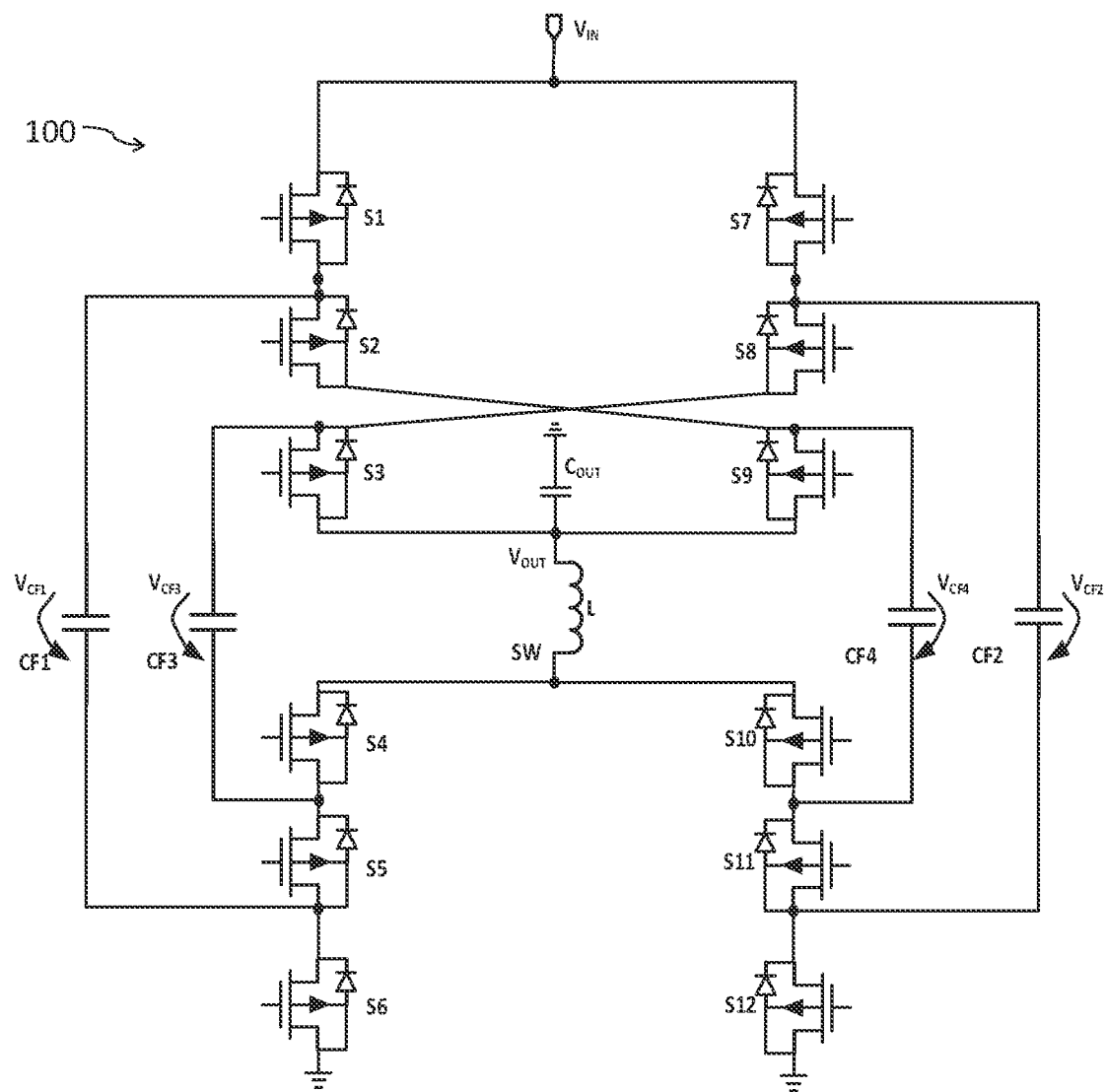

FIG. 1C shows a variant of the power converter 100 of FIG. 1A with the switches S4a and S10a being removed (thereby removing the possible link between nodes of the switches S1, S4 and S7, S10, respectively). The power converter 100 of FIG. 1C may be used for a limited range of VIN and/or for a limited range of conversion ratios, ⅓<CR<½. Furthermore, the power converter 100 of FIG. 1C may be used for providing the mode of operation M4.

Figure 1D:
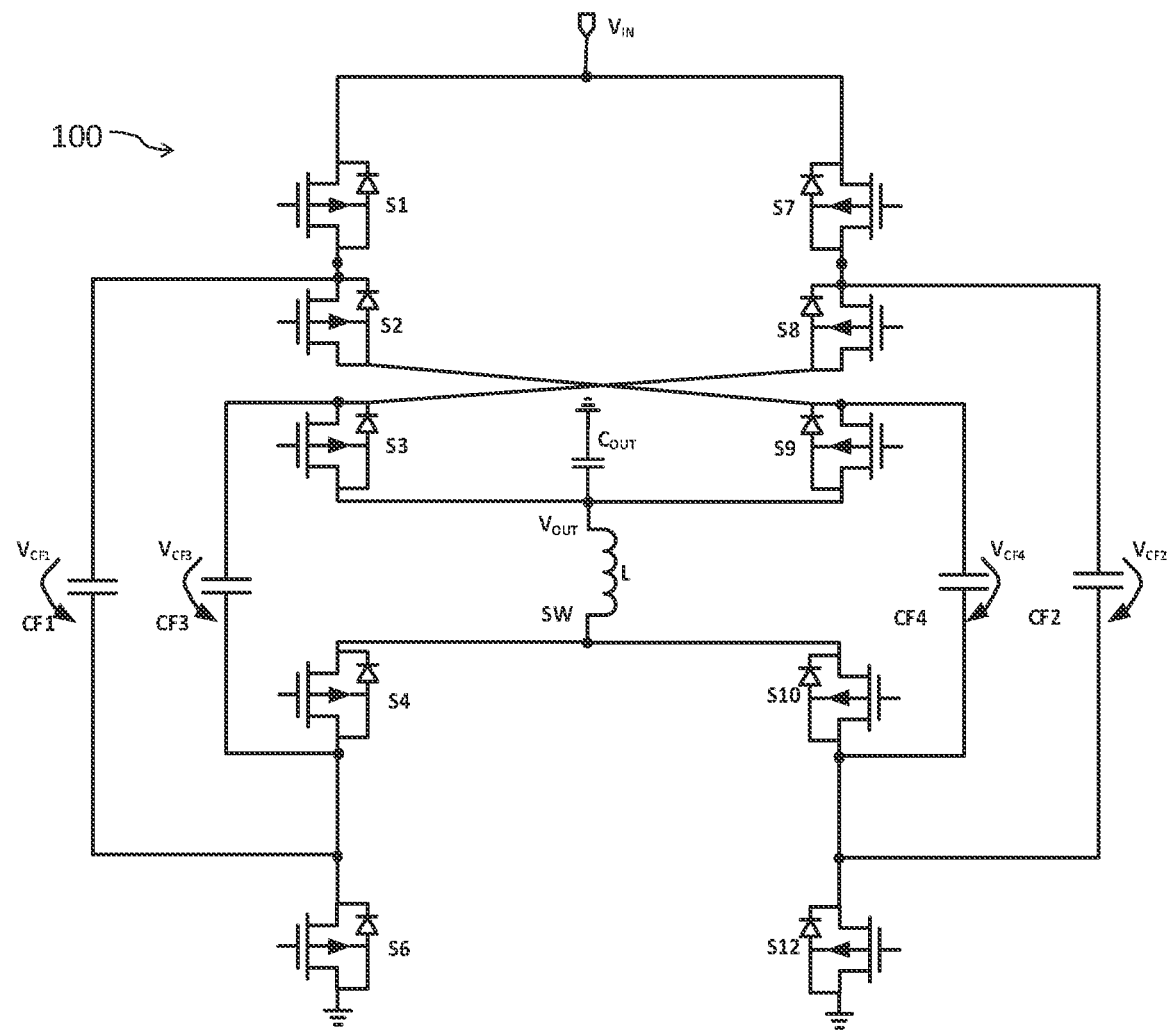

FIG. 1D shows a variant of the power converter 100 of FIG. 1A with the switches S4a, S5 and S10a and S11 being removed. The power converter 100 of FIG. 1D may be used for a limited range of VIN and/or for a limited range of conversion ratios, 0<CR<=⅓. Furthermore, the power converter 100 of FIG. 1D may be used to provide the operational modes M1 and R1.

The power converter and/or regulator 100 may be operated in different states, notably in states ST1, ST2, ST3, ST4, ST5, ST6 and/or ST7, which are described within the present document. Each state of the power converter 100 may be defined by a corresponding combination of the switching states (ON or OFF) of the (complete set of) power switches of the power converter 100.

The different states may be used for define one or more different modes of operation, notably M1, M2, M3 and/or M4, as well as resonant modes R1 and/or R2. Each mode of operation typically comprises a set and/or a sequence of states, which defines an operation cycle of the power converter 100. The operation cycle of a mode of operation is repeated continuously to operate the power converter 100 within this mode of operation (also referred to as operational mode).

The different modes of operation may be associated with different conversion ratios CR, in particular with different ranges of CRs. During operation of an electronic device and/or during a charging process, the input voltage Vin and/or the output voltage Vout may change any by consequence the CR may change. As a result of this, the power converter 100 may be operated over time in a sequence of different modes of operation. In the present document different sequences of modes of operation (i.e., operational modes) are defined, notably SM1, SM2 and/or SM3.

FIG. 6 provides an overview of the different modes of operation and the corresponding ranges of CR.

Based on these observations, the power converter 100 comprises:
10 power switches for low CR and/or for two sequences of operational modes SM1 and SM2. Switches S4a, S10a, S5, S11 could be removed (as shown in FIG. 1D);
12 power switches for a full range of CR and/or for two sequences of operational modes SM1 and SM2. Switches S5, S11 could be removed (as shown in FIG. 1B);
14 power switches for a full range of CR and for three possible sequences of operational modes SM1, SM2, SM3 (as shown in FIG. 1A).
1 inductor.
4 flying capacitors.

As indicated above, the nodes VOUT and SW are exchanged, which allows the use of lower voltage ratings for the flying capacitors and for the power switches.

Another benefit of the architecture of FIGS. 1A to 1D comes with the symmetry of the schematic. The two strings mirror each other by using the same type and size of power switches. As a result, the resistive paths of the current crossing power switches, the inductor and the flying capacitors towards the output of the converter 100 will be the same, regardless which one of the strings delivers the current. Keeping the resistances equal between strings is an enabler for keeping the flying capacitors balanced during switching.

The power converter 100 of FIGS. 1A to 1D may be operated in 2 to 4 different states within a switching cycle and/or may be operated in 6 different modes of operation M1, M2, M3, M4, R1 and/or R2, as indicated in FIG. 6.

A state of a mode of operation may be defined by 10, 12 or 14 ON/OFF states of all power switches.

A cycle may comprise 2, 4 or 6 different states (typically an even number). At the end of a cycle, the inductor current and the voltages on the flying capacitors should be rigorously equal with their initial values (at the beginning of the cycle). The controller (i.e., the control unit) may be configured to ensure that this condition is fulfilled. This condition is equivalent with keeping the converter 100 in regulation.

A mode of operation defines the cycle (how many switching states are comprised within a cycle) and the magnetization/demagnetization states inside the cycle. In other words, a mode of operation may provide a sequence of states inside a cycle and it may provide for each state the positions ON/OFF of all power switches of the converter 100.

When $V_{IN}$ moves within the range mentioned above, the switching sequence (i.e., the mode of operation) may need to be changed in order to allow the inductor to be magnetized and demagnetized and to keep the flying capacitors neutral within a cycle.

The ratio $V_{OUT}/V_{IN}$ is the so-called Conversion Ratio (CR). Keeping $V_{OUT}$ constant, CR varies inversely with $V_{IN}$. The parameter CR allows different topologies to be compared for the same set of external conditions ($V_{IN}$, $V_{OUT}$, $I_{LOAD}$) in terms of efficiency, inductor ripple, number of components, voltage ratings, etc.

Prior to switching start, the flying capacitors may be charged to certain voltages based upon a linear relationship of $V_{IN}$ and $V_{OUT}$. These formulas may be kept identical for the entire VIN range, when using the power converter 100 of FIGS. 1A to 1D. Pre-biasing the flying capacitors is not discussed herein. However, changing the formula of the voltage which is applied to the flying capacitors during $V_{IN}$ change, is typically a significant burden, which may be avoided when using the converter of FIGS. 1A to 1D. The following formulas may be used:

$$V_{CF1} = V_{CF2} = \frac{V_{IN} + V_{OUT}}{2}$$

$$V_{CF3} = V_{CF4} = V_{OUT}$$

These may be kept unchanged over the entire range of VIN and for the different modes of operations.

Six modes or operation (M1, R1, M2, R2, M3, M4) and eight states (ST1-ST8) of operation may be defined. A mode of operation may be defined by its relationship between VIN and VOUT. A state of the power converter 100 may be defined by the control signals controlling the gate voltage of all (10, 12 or 14) power switches of the power stage of FIGS. 1A to 1D.

The controller may be configured to determine the mode of operation by comparing $V_{IN}$ with $V_{OUT}$. The different modes of operation are shown in Table 1.

TABLE 1

| Mode | Voltages | Conversion ratio |
|---|---|---|
| M1 | VIN > 3*VOUT | (CR < 1:3) |
| R1 | 3*VOUT − ΔV < VIN < 3*VOUT + ΔV | CR ~1:3, where ΔV may e.g., be a few hundred mV |
| M2 | VOUT < VIN < 3*VOUT | (1 > CR > 1:3) |
| M3 | 2*VOUT < VIN < 3*VOUT | (CR > 1:3) |
| R2 | 2*VOUT − ΔV < VIN < 2*VOUT + ΔV | (CR ~1:2), where ΔV may e.g., be a few hundred mV |
| M4 | VOUT < VIN < 2*VOUT | (CR > 1:2) |

In the following, the switching sequences for each mode are described:

Mode M1: VIN>3*VOUT (CR<⅓).

Mode M1 (i.e., the first mode of operation) comprises four different states per cycle. In order to regulate the output voltage and to maintain stability of the system, it is typically mandatory that over one cycle, the average voltage on each flying capacitor and the average inductor current stays constant. These conditions are equivalent with two physical laws applied to inductor voltage and capacitor current: The Volt*s product over the inductor voltage and the Amp*s product over the CFX capacitors currents should be 0 over a period/cycle.

State ST1 201 is shown in FIG. 2A. The two current paths are drawn in solid lines for the inductor current path, and in a dashed line for the third current path (directly to the output). Tables 2.1, 2.2 and 2.3 show the states of all power switches and the voltages which each power switch should afford for maintaining the switches in OFF state (Tables 2.1 and 2.2);

the inductor state of magnetization (Table 2.3); and the flying capacitor charging states (Table 2.3).

TABLE 2.1

| S1/ON | S2/OFF | S3/OFF | S4/ON | S4a/OFF | S5/ON | S6/OFF |
|---|---|---|---|---|---|---|
| 0 | (VIN − VOUT)/2 | (VIN − VOUT)/2 | 0 | (VIN + VOUT)/2 | 0 | (VIN − VOUT)/2 |

TABLE 2.2

| S7/OFF | S8/ON | S9/ON | S10/OFF | S10a/OFF | S11/ON | S12/ON |
|---|---|---|---|---|---|---|
| (VIN − VOUT)/2 | 0 | 0 | (VIN − VOUT)/2 | VOUT | 0 | 0 |

TABLE 2.3

| L | CF1 | CF2 | CF3 | CF4 |
|---|---|---|---|---|
| Magnetize | Charge | Discharge | Charge | Discharge |

State ST2 is shown in FIG. 2B and Tables 3.1, 3.2, 3.3.

TABLE 3.1

| S1/OFF | S2/OFF | S3/ON | S4/ON | S4a/OFF | S5/ON | S6/ON |
|---|---|---|---|---|---|---|
| (VIN − VOUT)/2 | (VIN − VOUT)/2 | 0 | 0 | (VIN + VOUT)/2 | 0 | 0 |

TABLE 3.2

| S7/OFF | S8/OFF | S9/ON | S10/ON | S10a/OFF | S11/ON | S12/ON |
|---|---|---|---|---|---|---|
| (VIN − VOUT)/2 | (VIN − VOUT)/2 | 0 | 0 | (VIN + VOUT)/2 | 0 | 0 |

TABLE 3.3

| L | CF1 | CF2 | CF3 | CF4 |
|---|---|---|---|---|
| Demagnetize | Idle | Idle | Discharge/Idle | Discharge/Idle |

State ST3 is shown in FIG. 2C and Tables 4.1, 4.2, 4.3. It corresponds to state ST1 mirrored between the two strings.

TABLE 4.1

| S1/OFF | S2/ON | S3/OFF | S4/OFF | S4a/OFF | S5/ON | S6/ON |
|---|---|---|---|---|---|---|
| (VIN − VOUT)/2 | 0 | (VIN − VOUT)/2 | (VIN − VOUT)/2 | VOUT | 0 | 0 |

TABLE 4.2

| S7/ON | S8/OFF | S9/OFF | S10/ON | S10a/OFF | S11/ON | S12/OFF |
|---|---|---|---|---|---|---|
| 0 | (VIN − VOUT)/2 | (VIN − VOUT)/2 | 0 | (VIN + VOUT)/2 | 0 | (VIN − VOUT)/2 |

TABLE 4.3

| L | CF1 | CF2 | CF3 | CF4 |
|---|---|---|---|---|
| Magnetize | Discharge | Charge | Discharge | Charge |

The switching sequence for the first mode of operation M1 is ST1|ST2|ST3|ST2| within each cycle. It is a four-state cycle. The cycle is repeated.

There are different parameters associated with a DC/DC converter 100 that may be analysed:
CR: Conversion $$CR = \frac{VOUT}{VIN}$$

d: Duty cycle, characteristic to the inductor, measured at the SW node $$d = \frac{TON}{TSW} = \frac{TMag}{TSW}$$

ΔIL: Peak to Peak Inductor current ripple $$\left(\text{normalized to } \frac{V_{IN}*TSW}{L}\right)$$

IL: Average inductor current
ILOAD: Load current
ICP: Average current going directly to $V_{OUT}$ and not through inductor. It is a charge pump current contribution to the load (ICP=ILOAD−IL).

Figure 2D:
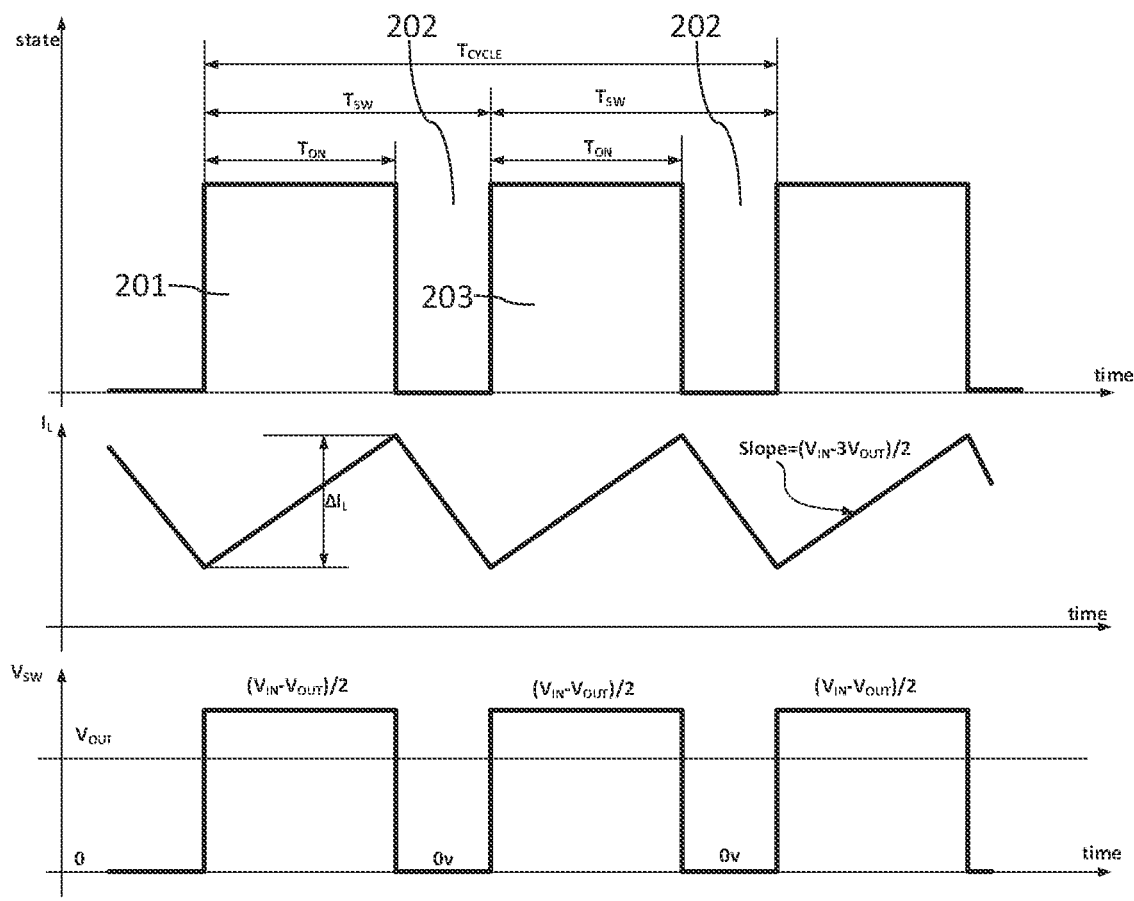
FIGS. 2D and 2E show different switching diagrams for operation of the power converter of FIGS. 1A to 1D.

FIG. 2D shows a cycle of the first mode of operation M1 for CR=0.25 and d=0.33. In particular, FIG. 2D shows the $T_{on}$ times for the first state ST1 201 and the third state ST3 203, as well as the duration of the second states ST2 202 (upper diagram). Furthermore, FIG. 2D shows the inductor current IL during the first mode of operation M1 (in the middle diagram). In addition, the voltage at the SW node is shown (in the lower diagram).

The power converter 100 has several advantages. Within a cycle there are two magnetization events associated with the states ST1 and ST3. From FIG. 2A and FIG. 2C, it can be seen that the current paths towards the SW node are different. In order to obtain the same slope of the inductor current IL within the two states, the same voltage $V_{SW}$ should be provided in these states, meaning that the two different paths should be equally resistive and capacitive. In view of this, identical types of power switches should be used on both strings, which can be achieved in an efficient and reliable manner due to the symmetry of the power converter 100.

The two states ST1 and ST3 provide two different supply paths for the inductor current. Due to the symmetry of the power converter 100, it can be assumed that each path provides half of the inductor current. As a result of this, the sizes of all power switches can be reduced by two (with a significant reduction of silicon area of the power stage) or, when keeping the same area for the power switches, the power loss on these resistive paths may be reduced by a factor of two, as shown by the following formula:

$$r1*\frac{IL^2}{4} + r1*\frac{IL^2}{4} = r1*\frac{IL^2}{2}$$

During the magnetization phases (ST1 and ST3), a part of the inductor current is provided from VIN and another part is provided from GND. Due to the fact that just a half of the inductor current is provided from VIN, the current spike on the input capacitor (connected to VIN) and on the GND node are reduced to a half.

As already indicated above, for the first mode of operation M1 (low CR), there are 4 switches (S5, S11, S4a, S10a) which may be removed, because they are kept in the same state.

Consequently, the converter power switch count drops from 14 to 10.

By using the Amp*s and Volt*s theorems for the flying capacitors CFx and respectively for the inductor L over one cycle (S1|S2|S3|S2), the following formulas for d, CR, ΔIL, ICP associated with mode M1 (CR<⅓) may be provided:

$$d = \frac{2CR}{1-CR}$$

$$CR = \frac{d}{2+d}$$

$$\Delta IL = \frac{CR*(1-3CR)}{1-CR}$$

$$ICP = CR$$

In the following, the first resonant mode of operation R1 for 3*VOUT-ΔV<VIN<3*VOUT+ΔV, (CR ~⅓), where ΔV may be a few hundred mV, is described. It can be seen in FIG. 2D and FIG. 2E that $V_{IN}$ decreasing towards 3*$V_{OUT}$ generates a 0 slope for the inductor current, thereby stopping the magnetization. Hence, if the same switching sequence is kept, a drop in inductor current and a drop in VOUT would be generated. Furthermore, it can see that TON, which is generated by the control unit, reaches $T_{sw}$ and d=1 (i.e., saturation of the system). In practice, the saturation of the system will happen before $V_{IN}$ reaches 3*$V_{OUT}$ (i.e., at 3*$V_{OUT}$−ΔV) due to losses on the resistive paths of the power stage 100. This situation is shown in FIG. 2E.

Figure 2E:
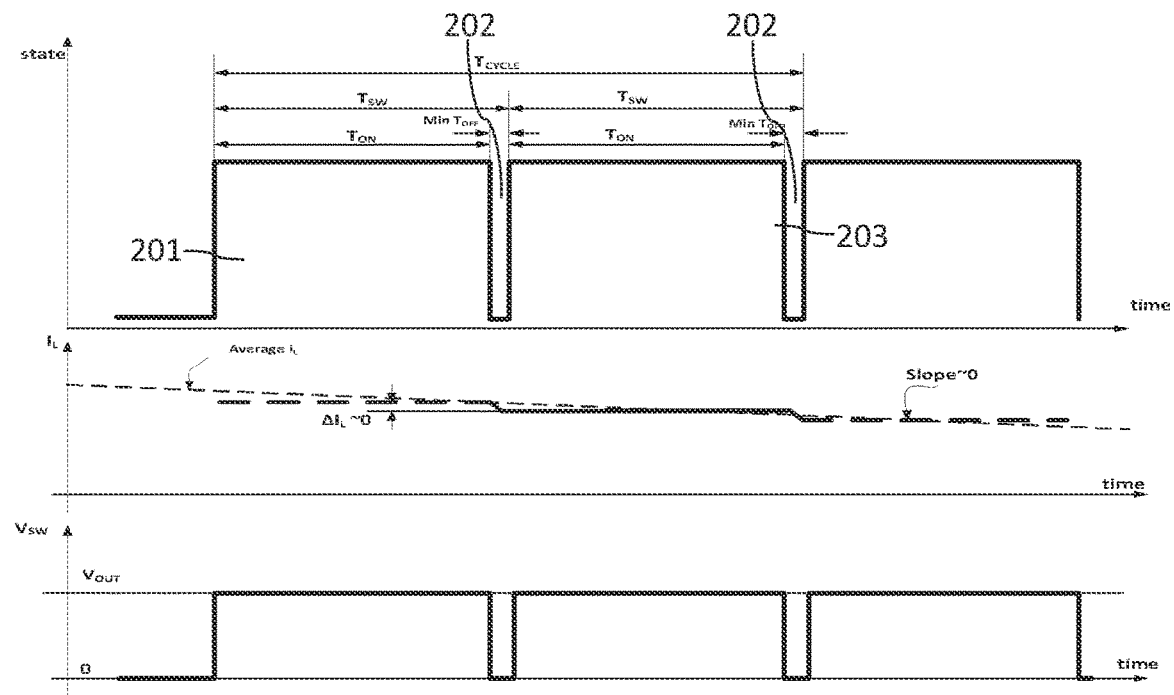

Due to the missing magnetization and with demagnetization still being applied to the inductor in very short pulses (limited by digital control to around 40 ns) a drop of the average inductor current and a drop of the output voltage is generated (as seen in the middle diagram of FIG. 2E). In view of this, a new mode of operation, in particular the first resonant mode R1, may be entered.

Entering the mode R1 may be done by sensing Min $T_{OFF}$. Exiting the mode R1 may be done by sensing a drop of $V_{OUT}$ to an acceptable level. Mode R1 is a very efficient mode due to 0 ripple current and 0 power core loss of the inductor. In view of this, it is preferable to maintain operation within the mode R1 for as long as possible (if the application of the power converter 100 can tolerate the drop of $V_{OUT}$).

There are 2 states per cycle during the first resonant mode R1: ST1 and ST3, as shown in FIGS. 2A and 2C, respectively. The switching sequence for mode R1 is ST1|ST3|ST1|ST3| . . . , etc. It is a two-state cycle. Hence, the switching sequence for R1 is the same as for the first mode M1 with the demagnetization phase ST2 being removed.

In the following, the mode of operation M2 for 3*VOUT>VIN>VOUT (⅓<CR<1) is described. Mode M1 cannot be used for $V_{IN}$<3*$V_{OUT}$ because all 4 states demagnetize the inductor, such that the inductor current cannot be kept constant for supplying the load. The second mode M2 comprises a new state ST4, which provides the magnetization of the inductor from $V_{IN}$ instead of ($V_{IN}$-$V_{OUT}$)/2.

Figure 3A:
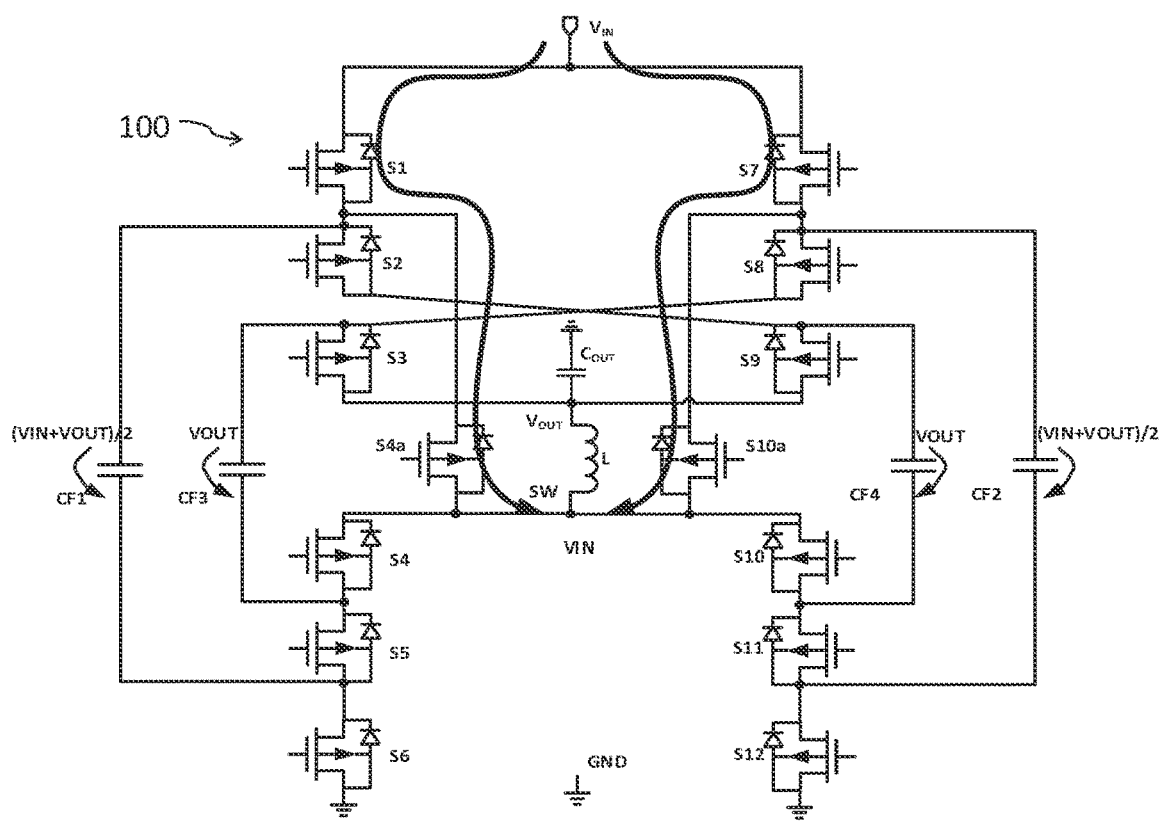
FIG. 3A shows a fourth state of the power converter of FIGS. 1A to 1D.

State ST4 is shown in FIG. 3A and details of power switches, inductor and flying capacitors states are shown in Tables 5.1, 5.2, and 5.3. The switches S3 and S9 are ON in order to avoid a floating state for CF3, CF4. Switches S3 and S9 keep CF3 and CF4 connected to VOUT. These switches don't drain current.

TABLE 5.1

| S1/ON | S2/OFF | S3/ON | S4/OFF | S4a/ON | S5/OFF | S6/OFF |
|---|---|---|---|---|---|---|
| 0 | (VIN − VOUT)/2 | 0 | VIN/3 | 0 | VIN/3 | VIN/3 |

TABLE 5.2

| S7/ ON | S8/ OFF | S9/ ON | S10/ OFF | S10a/ ON | S11/ OFF | S12/ OFF |
|---|---|---|---|---|---|---|
| 0 | (VIN − VOUT)/2 | 0 | VIN/3 | 0 | 0 | 0 |

TABLE 5.3

| L | CF1 | CF2 | CF3 | CF4 |
|---|---|---|---|---|
| Magnetize | Idle | Idle | Discharge/Idle | Discharge/Idle |

Figure 3B:
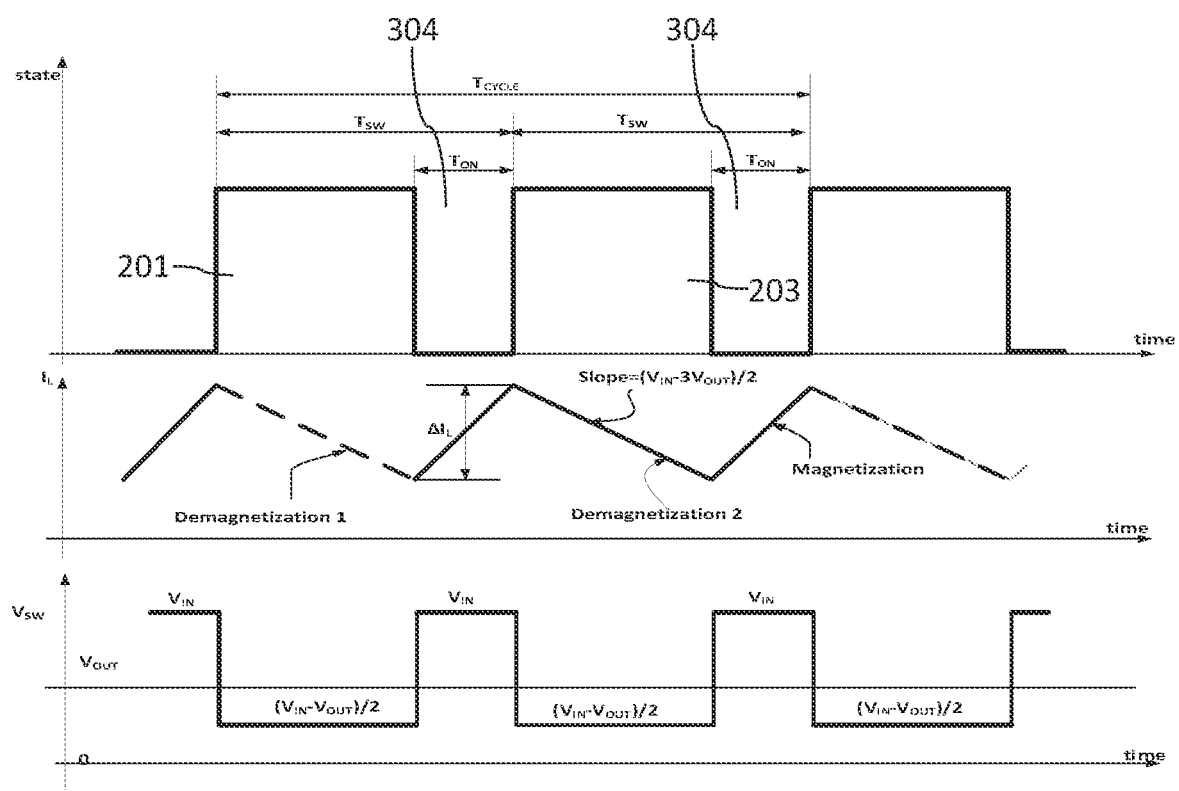
FIG. 3B shows another switching diagram for operating the power converter of FIGS. 1A to 1D.

Switching sequence for the second mode M2 is ST1|ST4|ST3|ST4|ST1|ST4|ST3|ST4 . . . as shown in FIG. 3B. It is a 4 states cycle. States ST1 and ST3 are the same as defined for Mode M1. However, for mode M1 these two states provide magnetization of the inductor. On the other hand, for mode M2, these two states provide demagnetization of the inductor because the value of $V_{IN}$ has changed.

FIG. 3B shows main waveforms associated with second mode M2 for CR=½, which generated d=⅓.

By using the Amp*s and Volt*s theorems for the flying capacitors CFx (with x=1 to 4) and respectively the inductor L over one cycle (S1|S4|S3|S4), the following formulas for d, CR, ΔIL, ICP associated with mode M2 (CR>⅓) may be provided.

$$d = \frac{3CR - 1}{1 + CR}$$

$$CR = \frac{d + 1}{3 - d}$$

$$\Delta IL = \frac{(3CR - 1) * (1 - CR)}{1 + CR}$$

$$ICP = \frac{1 - CR}{2}$$

Figure 4A:
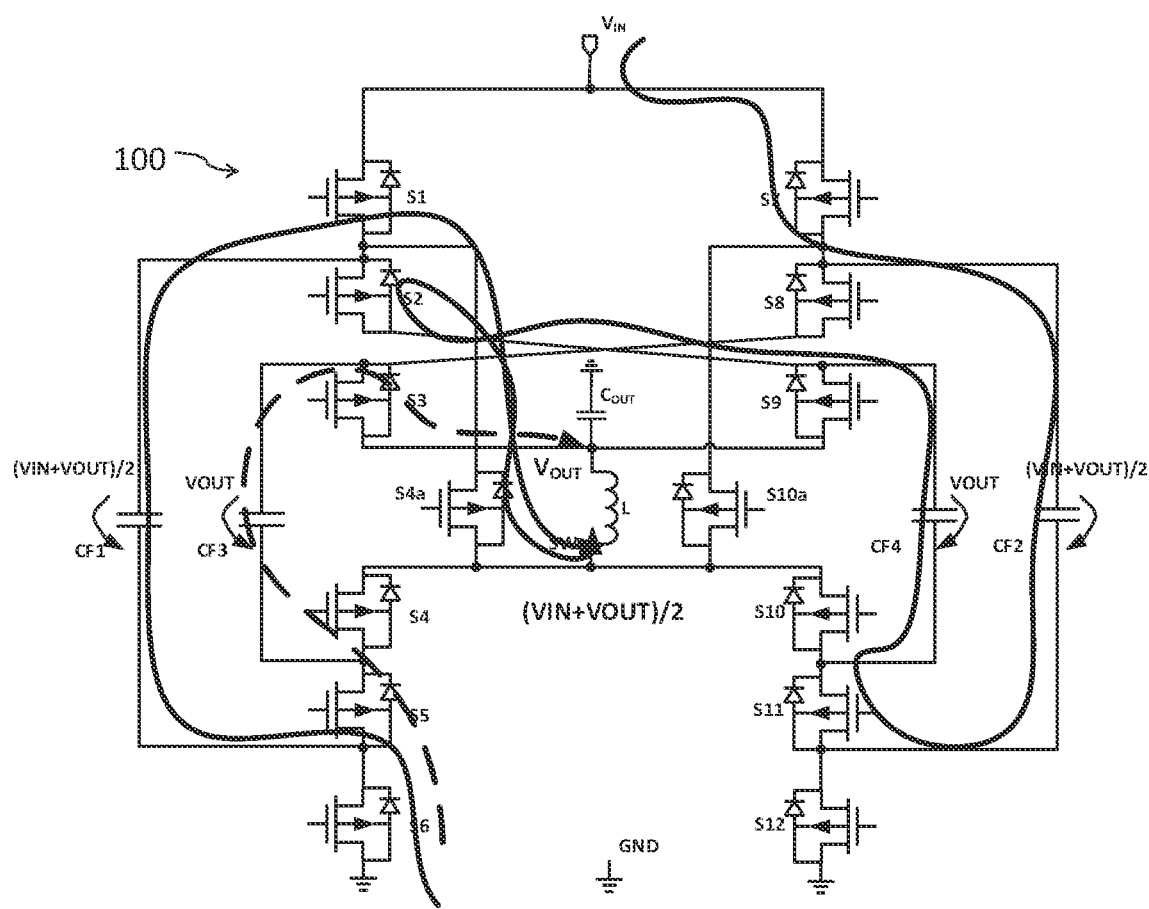
FIGS. 4A, 4B, 5A and 5B show a fifth, sixth, seventh and eighth state, respectively.
Figure 4B:
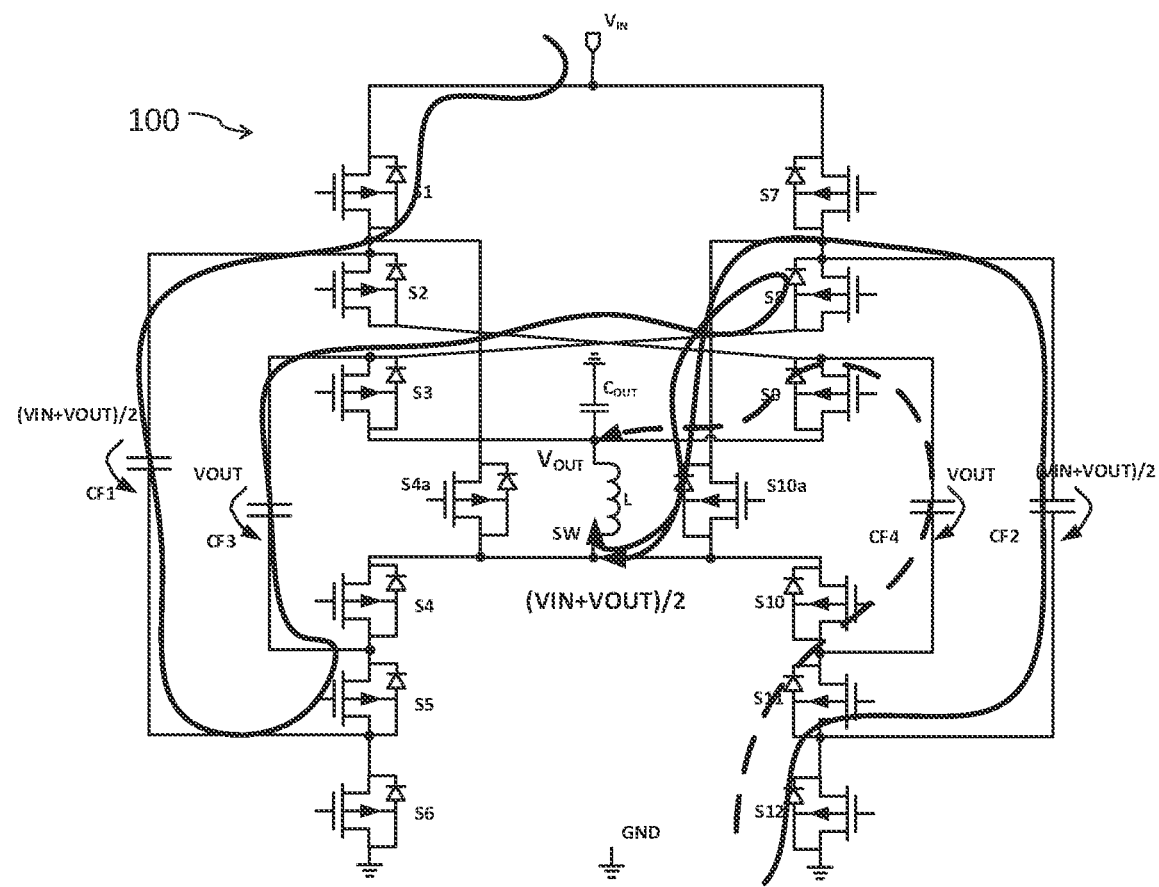

As an alternative to Mode 2 a third mode M3 or a fourth mode M4 with their associated states ST5 (shown in FIG. 4A) and ST6 (shown in FIG. 4B) may be used. Mode M3 for $V_{OUT}<V_{IN}<3*V_{OUT}$ (or 1>CR>⅓) may make use of an alternative way to magnetize the inductor from $(V_{IN}+V_{OUT})/2$. For this purpose, State ST5 and State ST6 (which is complementary to ST5) may be used to perform magnetization from $(V_{IN}+V_{OUT})/2$". The switching sequence for the third mode 3 is ST1|ST5|ST3|ST6 for CR>⅓.

Mode M4 may be used for 2*VOUT<VIN<3*VOUT (½>CR>⅓). Mode M4 makes use of a state ST7 (shown in FIG. 5A) and a complementary state ST8 (shown in FIG. 5B) to magnetize the inductor from $V_{IN}-V_{OUT}$. The switching sequence for mode 4 is ST1|ST7|ST3|ST8 working for ½>CR>⅓.

There is a gap in the functionality of mode M4 for the CR>½ condition, when $V_{IN}<2*V_{OUT}$ and "Magnetization from (VIN-VOUT)" does not hold. In order to fill this gap, state ST4 (Magnetization from $V_{IN}$) may be used. Hence, mode M2: ST1|ST4|ST3|ST4 working for CR>½ may be used.

A second resonant mode R2 may be used in the range 2*VOUT−ΔV<VIN<2*VOUT+ΔV, (CR ~½), where ΔV is a few hundred mV. Entering and exiting may be the same as for the first resonant mode R1. The second resonant mode R2 comprises the sequence of states ST7, ST8, which is repeated in subsequent operation cycles.

The above-mentioned modes may be combined in order to provide a full range VIN converter.

There are different Sequences of Modes (SM) which may be used (as illustrated in FIG. 6), e.g., when $V_{IN}$ moves from high voltages towards low voltages:

SM1: M1+R1+M2 with one resonant mode R1 at VIN=3*VOUT

SM2: M1+R1+M3 with one resonant mode R1 at VIN=3*VOUT

SM3: M1+R1+M4+R2+M2 with two resonant modes, R1 at VIN=3*VOUT and R2 at VIN=2*VOUT.

Mode M4 is used only in sequence SM3 and states ST7 and ST8 are used only in modes M4 and R2. Switches S5 and S11 are needed only during states ST7 and ST8. During all other states and modes, they are closed. Hence, these switches may be removed and replaced with shortages.

Hence, a power converter 100 is described, for which the VOUT node and the SW node are swapped, which allows reduction of the voltage ratings of the power switches of the power converter 100. The voltages placed on the flying capacitors is $((V_{IN}+V_{OUT})/2$ and $V_{OUT})$, thereby allow a drop in voltage rating of power switches and flying capacitors. The voltages placed on the flying capacitors as a combination of VIN and VOUT may be kept constant over the entire $V_{IN}$ range, allowing an easy control of the switching sequence.

The symmetry of the schematic allows for an easy scalability of the circuit, such as an extension on the vertical direction (to accommodate higher $V_{IN}$) and on the horizontal direction (to accommodate higher load current). The use of dual paths for the inductor current allows a significant drop in resistive power loss or a reduction of the switch area at the same efficiency. The topology which is described herein supplies inductor current at every single moment of time through two paths instead of one. It should be noted that the number of paths can be extended to more than two paths.

Two paths for inductor current and one path for the direct current to the output sums up to three current paths being delivered to the output. The improvement in the efficiency by using multiple paths for inductor current instead of a single path is illustrated by the formula below $$Ploss_{npaths} = r1*\frac{IL2}{n2} + r2*\frac{IL2}{n2} + r3*\frac{IL2}{n2} + \ldots + rn*\frac{IL2}{n2} = r*\frac{IL2}{n} = \frac{Ploss1path}{n}$$

Each path delivers a portion of the inductor current (IL/n) if n different paths of equal resistance rx are provided. It may be assumed that r1+r2+r3+···+rn=r.

It has been found that the switching sequences which are described herein keep the flying capacitors balanced, and generate dual current paths into the same inductor.

Hence, a power converter 100 is described. The power converter 100 may be operated in a particularly efficient manner for CR≤⅓. It should be noted that the terms "first", "second", etc. do not refer to a specific numbering, but serve to identify components, notably power switches or flying capacitors, of the power converter 100.

The power converter 100 comprises,
- an (notably a single) inductor L, which is arranged between a SW node and the output node of the power converter 100;
- a first power switch S1 having a first node (possibly directly) coupled to the input node of the power converter (100), and having a second node;
- a second power switch S2 having a first node (possibly directly) coupled to the second node of the first power switch (S1), and having a second node;
- a third power switch S3 having a first node, and having a second node (possibly directly) coupled to the output node;
- a fourth power switch S4 having a first node (possibly directly) coupled to the SW node and having a second node;
- a sixth power switch S6 having a first node (possibly directly) coupled to the second node of the fourth power switch S4, and having a second node (possibly directly) coupled to the reference node (e.g., to ground) of the power converter 100;
- a first flying capacitor CF1 arranged between the second node of the first switch S1 and the first node of the sixth switch S6;
- a third flying capacitor CF3 arranged between the first node of the third switch S3 and the second node of the fourth switch S4;
- a seventh power switch S7 having a first node (possibly directly) coupled to the input node of the power converter 100, and having a second node;
- an eighth power switch S8 having a first node (possibly directly) coupled to the second node of the seventh power switch S7, and having a second node;
- a ninth power switch S9 having a first node, and having a second node (possibly directly) coupled to the output node;
- a tenth power switch S10 having a first node (possibly directly) coupled to the SW node and having a second node;
- a twelfth power switch S12 having a first node (possibly directly) coupled to the second node of the tenth power switch S10, and having a second node (possibly directly) coupled to the reference node of the power converter 100;
- a second flying capacitor CF2 arranged between the second node of the seventh switch S7 and the first node of the twelfth switch S12; and/or.
- a fourth flying capacitor CF4 arranged between the first node of the ninth switch S9 and the second node of the tenth switch S10.

The second node of the second switch S2 may be (possibly directly) coupled to the first node of the ninth switch S9. The second node of the eighth switch S8 may be (possibly directly) coupled to the first node of the third switch S3.

As such, the first, second and third power switch may be high side switches, which are connected between the input node and the output node. Furthermore, the fourth and sixth power switch may be low side switches, which are connected between the SW node and the reference node. Furthermore, the seventh, eighth and ninth power switch may be high side switches, which are connected between the input node and the output node. In addition, the tenth and twelfth power switch may be low side switches, which are connected between the SW node and the reference node.

The power switches may be field effect transistors (FET), in particular metaloxide semiconductor FETs (MOSFETs). In the Figures of the present document NMOS switches are illustrated. It should be noted that other types of power switches may be used, such as PMOS, bipolar, etc.

Hence, the power converter 100 may be symmetrical, wherein,
- the first arrangement comprising the first switch S1, the second switch S2, the third switch S3, the fourth switch S4, the sixth switch S6, the first flying capacitor CF1 and the third flying capacitor CF3; and
- the second arrangement comprising the seventh switch S7, the eighth switch S8, the ninth switch S9, the tenth switch S10, the twelfth switch S12, the second flying capacitor CF2 and the fourth flying capacitor CF4;

may be being arranged in a symmetrical manner to each other with regards to the input node and the output node.

The power converter 100 may comprise a control unit which is configured to operate the power converter 100 within a first mode of operation to provide a conversion of the input voltage at the input node to the output voltage at the output node in accordance to a conversion ratio. The first mode of operation typically comprises a sequence of different states 201, 202, 203 of the power converter 100 for an operation cycle, in particular for each operation cycle, of the first mode of operation. The first mode of operation may be used for CR<⅓

The sequence of different states may comprise at least one state 201, 203 (notably the first state and/or the third state) during which the inductor current through the inductor L is provided by at least two different current paths. In particular, the inductor current through the inductor L may be provided by a first current path from the input node and a second current path from the reference node, thereby enabling a particularly efficient operation of the power converter 100.

The first mode of operation may be such that the voltage across the flying capacitors CF1, CF2, CF3, CF4 is set to (VIN+VOUT)/2 or VOUT, with VIN being the input voltage at the input node and with VOUT being the output voltage at the output node. In particular, the voltage on the first and/or the second flying capacitor CF1 and/or CF2 may be set to (VIN+VOUT)/2. The voltage on the third and/or the fourth flying capacitor CF3 and/or CF4 may be set to $V_{OUT}$. This may be the case of a wide range of input voltages, thereby enabling a particularly efficient control of the power converter 100.

The sequence of states (of the first mode of operation) may comprise a first state 201 during which,
- the first switch S1 is ON;
- the second switch S2 is OFF;
- the third switch S3 is OFF;
- the fourth switch S4 is ON;
- the sixth switch S6 is OFF;
- the seventh switch S7 is OFF;
- the eighth switch S8 is ON;
- the ninth switch S9 is ON;
- the tenth switch S10 is OFF; and/or.
- the twelfth switch S12 is ON.

The inductor L may be magnetized during the first state 201.

Alternatively, or in addition, the sequence of states may comprise a third state 203 which may be complimentary to the first state 201. The sequence of states may comprise a third state 203 during which
- the first switch S1 is OFF;
- the second switch S2 is ON;
- the third switch S3 is OFF;
- the fourth switch S4 is OFF;
- the sixth switch S6 is ON;
- the seventh switch S7 is ON;
- the eighth switch S8 is OFF;
- the ninth switch S9 is OFF;
- the tenth switch S10 is ON; and/or.
- the twelfth switch S12 is OFF.

The inductor L may be magnetized during the third state 203.

Alternatively, or in addition, the sequence of states may comprise a second state 202 during which
- the first switch S1 is OFF;
- the second switch S2 is OFF;
- the third switch S3 is ON;
- the fourth switch S4 is ON;
- the sixth switch S6 is ON;
- the seventh switch S7 is OFF;
- the eighth switch S8 is OFF;
- the ninth switch S9 is ON;
- the tenth switch S10 is ON; and/or.
- the twelfth switch S12 is ON.

The inductor L may be demagnetized during the second state 202.

The sequence of states 201, 202, 203 for the first mode of operation may comprise the first state 201 followed by the second state 202 followed by the third state 203 and followed by the second state 202, thereby allowing for a particular efficient and robust operation of the power converter 100.

The control unit may be configured to set the duration (TON) of the first state 201 and/or of the second state 203 in dependence of the conversion ratio and/or in dependence of the input voltage and/or in dependence of the output voltage. Furthermore, the power converter 100 may comprise a regulation loop configured to set the duration of the second state 202. By doing this, a particularly robust operation of the power converter 100 may be achieved.

The control unit may be configured to operate the power converter 100 in a first resonant mode of operation with a sequence of states that only comprises the first state 201 and the third state 203 (and does not comprise the second state). In particular, the control unit may be configured to detect that the conversion ratio lies within a pre-determined interval around a target conversion ratio, wherein the target conversion ratio may be ⅓. In reaction to the detecting, a change from the first mode of operation to the first resonant mode of operation may be performed. By doing this, a particularly efficient operation of the power converter 100 may be achieved.

The power converter 100 may further comprise (as illustrated in FIGS. 1A and 1B)
- a first auxiliary power switch S4a having a first node which is (possibly directly) coupled to the second node of the first power switch S1, and having a second node which is (possibly directly) coupled to the SW node; and
- a second auxiliary power switch S10a having a first node which is (possibly directly) coupled to the second node of the seventh power switch S7, and having a second node which is (possibly directly) coupled to the SW node.

The sequence of states, notably the mode of operation M3, may comprise a fifth state (ST5) during which
- the first switch S1 is OFF;
- the second switch S2 is ON;
- the third switch S3 is ON;
- the fourth switch S4 is OFF;
- the sixth switch S6 is ON;
- the seventh switch S7 is ON;
- the eighth switch S8 is OFF;
- the ninth switch S9 is OFF;
- the tenth switch S10 is OFF;
- the twelfth switch S12 is OFF;
- the first auxiliary power switch S4a is ON; and
- the second auxiliary power switch S10a is OFF.

Alternatively, or in addition, the sequence of states, notably the mode of operation M3, may comprise a sixth state (ST6) during which
- the first switch S1 is ON;
- the second switch S2 is OFF;
- the third switch S3 is OFF;
- the fourth switch S4 is OFF;
- the sixth switch S6 is OFF;
- the seventh switch S7 is OFF;
- the eighth switch S8 is ON;
- the ninth switch S9 is ON;
- the tenth switch S10 is OFF;
- the twelfth switch S12 is ON;
- the first auxiliary power switch S4a is OFF; and
- the second auxiliary power switch S10a is ON.

As indicated above, the third mode of operation M3 may comprise the following sequence of states within a switching cycle: ST1, ST5, ST3, ST6. The mode of operation M3 may be implemented using the variants of the power converter 100 shown in FIGS. 1A and 1B.

Alternatively, or in addition, the sequence of states, notably the second mode of operation M2, may comprise a fourth state (ST4) during which
- the first switch S1 is ON;
- the second switch S2 is OFF;
- the third switch S3 is OFF;
- the fourth switch S4 is OFF;
- the sixth switch S6 is OFF;
- the seventh switch S7 is ON;
- the eighth switch S8 is OFF;
- the ninth switch S9 is OFF;
- the tenth switch S10 is OFF;
- the twelfth switch S12 is OFF;
- the first auxiliary power switch S4a is ON; and
- the second auxiliary power switch S10a is ON.

As indicated above, the second mode of operation M2 may comprise the following sequence of states within a switching cycle: ST1, ST4, ST3, ST4. The mode of operation M2 may be implemented using the variants of the power converter 100 shown in FIGS. 1A and 1B.

Alternatively, or in addition, the power converter 100 may further comprise (as illustrated in FIGS. 1A and 1C),
- a fifth power switch S5 having a first node which is (possibly directly) coupled to the second node of the fourth power switch S4, and having a second node which is (possibly directly) coupled to the first node of the sixth power switch S6; and
- an eleventh power switch S11 having a first node which is (possibly directly) coupled to the second node of the tenth power switch S10, and having a second node which is (possibly directly) coupled to the first node of the twelfth power switch S12.

The sequence of states, notably the mode of operation M4, may comprise a seventh state (ST7) during which
the first switch S1 is ON;
the second switch S2 is ON;
the third switch S3 is ON;
the fourth switch S4 is OFF;
the sixth switch S6 is ON;
the seventh switch S7 is OFF;
the eighth switch S8 is OFF;
the ninth switch S9 is OFF;
the tenth switch S10 is ON;
the twelfth switch S12 is OFF;
the fifth power switch S5 is ON; and
the eleventh power switch S11 is OFF.

The sequence of states, notably the mode of operation M4, may comprise an eighth state (ST8) during which
the first switch S1 is OFF;
the second switch S2 is OFF;
the third switch S3 is OFF;
the fourth switch S4 is ON;
the sixth switch S6 is OFF;
the seventh switch S7 is ON;
the eighth switch S8 is ON;
the ninth switch S9 is ON;
the tenth switch S10 is OFF;
the twelfth switch S12 is ON;
the fifth power switch S5 is OFF; and
the eleventh power switch S11 is ON.

As indicated above, the fourth mode of operation M4 may comprise the following sequence of states within a switching cycle: ST1, ST7, ST3, ST8. The mode of operation M4 may be implemented using the variants of the power converter 100 shown in FIGS. 1A and 1C.

Hence, the additional power switches may be used to provide further modes of operations (as outlined in the present document) for extending the range of operation of the power converter 100 (with regards to the possible input voltages and/or CRs).

The control unit of the power converter may be configured to operate the power converter 100 within a plurality of different modes of operation to provide a conversion of the input voltage at the input node to the output voltage at the output node in accordance to the conversion ratio. As outlined above, the conversion ratio indicates the ratio output voltage/input voltage.

The plurality of modes of operations may comprise
a first mode of operation (M1) which comprises for an operation cycle the first state 201 followed by the second state 202 followed by the third state 203 and followed by the second state 202;
a first resonant mode of operation (R1) which comprises for an operation cycle the first state 201 followed by the third state 203;
a second mode of operation (M2) which comprises for an operation cycle the first state 201 followed by the fourth state followed by the third state 203 and followed by the fourth state;
a third mode of operation (M3) which comprises for an operation cycle the first state 201 followed by the fifth state followed by the third state 203 and followed by the sixth state;
a fourth mode of operation (M4) which comprises for an operation cycle the first state 201 followed by the seventh state followed by the third state 203 and followed by the eighth state; and/or
a second resonant mode of operation (R2) which comprises for an operation cycle the seventh state followed by the eighth state.

Furthermore, the control unit may be configured to operate the power converter 100 in accordance to one or more different sequences of modes as the conversion ratio varies from 0 to 1 (as illustrated e.g., in FIG. 6).

The one or more sequences of modes may comprise
a first sequence (SM1) comprising the first mode of operation for conversion ratios 0 to $<\frac{1}{3}$, the first resonant mode of operation for a conversion ratio $\frac{1}{3}$, and the second mode of operation for conversion ratios $>\frac{1}{3}$ to 1;
a second sequence (SM2) comprising the first mode of operation for conversion ratios 0 to $<\frac{1}{3}$, the first resonant mode of operation for a conversion ratio $\frac{1}{3}$, and the third mode of operation for conversion ratios $>\frac{1}{3}$ to 1; and/or
a third sequence (SM3) comprising the first mode of operation for conversion ratios 0 to $<\frac{1}{3}$, the first resonant mode of operation for a conversion ratio $\frac{1}{3}$, the fourth mode of operation for conversion ratios $>\frac{1}{3}$ to $<\frac{1}{2}$, the second resonant mode of operation for a conversion ratio $\frac{1}{2}$ and the second mode of operation for conversion ratios $>\frac{1}{2}$ to 1.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter comprising:
an inductor, which is arranged between a SW node and an output node of the power converter;
a first power switch having a first node coupled to an input node of the power converter, and having a second node;
a second power switch having a first node coupled to the second node of the first power switch, and having a second node;
a third power switch having a first node, and having a second node coupled to the output node;
a fourth power switch having a first node coupled to the SW node and having a second node;
a sixth power switch having a first node coupled to the second node of the fourth power switch, and having a second node coupled to a reference node of the power converter;
a first flying capacitor arranged between the second node of the first switch and the first node of the sixth switch;
a third flying capacitor arranged between the first node of the third switch and the second node of the fourth switch;
a seventh power switch having a first node coupled to the input node of the power converter, and having a second node;
an eighth power switch having a first node coupled to the second node of the seventh power switch, and having a second node;

a ninth power switch having a first node, and having a second node coupled to the output node;

a tenth power switch having a first node coupled to the SW node and having a second node;

a twelfth power switch having a first node coupled to the second node of the tenth power switch, and having a second node coupled to the reference node of the power converter;

a second flying capacitor arranged between the second node of the seventh switch and the first node of the twelfth switch; and a fourth flying capacitor arranged between the first node of the ninth switch and the second node of the tenth switch; wherein the second node of the second switch is coupled to the first node of the ninth switch; and wherein the second node of the eighth switch is coupled to the first node of the third switch.

2. The power converter according to claim 1, wherein the power converter is symmetrical with:

a first arrangement comprising the first switch, the second switch, the third switch, the fourth switch, the sixth switch, the first flying capacitor and the third flying capacitor; and a second arrangement comprising the seventh switch, the eighth switch, the ninth switch, the tenth switch, the twelfth switch, the second flying capacitor and the fourth flying capacitor, being arranged in a symmetrical manner to each other with regards to the input node and the output node.

3. The power converter according to claim 1, wherein:

the power converter comprises a control unit which is configured to operate the power converter within a first mode of operation to provide a conversion of an input voltage at the input node to an output voltage at the output node in accordance to a conversion ratio; and the first mode of operation comprises a sequence of different states of the power converter for an operation cycle, in particular for each operation cycle, of the first mode of operation.

4. The power converter according to claim 3, wherein:

the sequence of different states comprises at least one state during which an inductor current through the inductor is provided by at least two different current paths; and the inductor current through the inductor is provided by a first current path from the input node and a second current path from the reference node.

5. The power converter according to claim 3, wherein the first mode of operation is such that a voltage across the flying capacitors is set to $(V_{IN}+V_{OUT})/2$ or $V_{OUT}$, with $V_{IN}$ being the input voltage at the input node and with $V_{OUT}$ being the output voltage at the output node.

6. The power converter according to claim 3, wherein:

the sequence of states comprises a first state during which,
the first switch is ON;
the second switch is OFF;
the third switch is OFF;
the fourth switch is ON;
the sixth switch is OFF;
the seventh switch is OFF;
the eighth switch is ON;
the ninth switch is ON;
the tenth switch is OFF; and
the twelfth switch is ON; and
the inductor is magnetized during the first state.

7. The power converter according to claim 6, wherein:

the sequence of states comprises a third state which is complimentary to the first state; or the sequence of states comprises a third state during which:
the first switch is OFF;
the second switch is ON;
the third switch is OFF;
the fourth switch is OFF;
the sixth switch is ON;
the seventh switch is ON;
the eighth switch is OFF;
the ninth switch is OFF;
the tenth switch is ON; and
the twelfth switch is OFF; and
the inductor is magnetized during the third state.

8. The power converter according to claim 7, wherein:

the sequence of states comprises a second state during which:
the first switch is OFF;
the second switch is OFF;
the third switch is ON;
the fourth switch is ON;
the sixth switch is ON;
the seventh switch is OFF;
the eighth switch is OFF;
the ninth switch is ON;
the tenth switch is ON; and
the twelfth switch is ON; and
the inductor is demagnetized during the second state.

9. The power converter according to claim 8, wherein the sequence of states comprises the first state followed by the second state followed by the third state and followed by the second state.

10. The power converter according to claim 9, wherein the control unit is configured to set a duration of the first state or of the second state in dependence of the conversion ratio or in dependence of the input voltage or in dependence of the output voltage.

11. The power converter according to claim 10, wherein the power converter comprises a regulation loop configured to set a duration of the second state.

12. The power converter according to claim 7, wherein the control unit is configured to operate the power converter in a first resonant mode of operation with a sequence of states that only comprises the first state and the third state.

13. The power converter according to claim 12, wherein the control unit is configured to:

detect that the conversion ratio lies within a pre-determined interval around a target conversion ratio; wherein in particular the target conversion ratio is 1:3; and in reaction to the detecting, changing from the first mode of operation to the first resonant mode of operation.

14. The power converter according to claim 1, wherein the power converter further comprises:

a first auxiliary power switch having a first node which is coupled to the second node of the first power switch, and having a second node which is coupled to the SW node; and a second auxiliary power switch having a first node which is coupled to the second node of the seventh power switch, and having a second node which is coupled to the SW node.

15. The power converter according to claim 14, wherein a sequence of states comprises a fifth state during which:
the first switch is OFF;
the second switch is ON;
the third switch is ON;
the fourth switch is OFF;

the sixth switch is ON;
the seventh switch is ON;
the eighth switch is OFF;
the ninth switch is OFF;
the tenth switch is OFF;
the twelfth switch is OFF;
the first auxiliary power switch is ON; and
the second auxiliary power switch is OFF.

16. The power converter according to claim 14, wherein a sequence of states comprises a sixth state during which:
the first switch is ON;
the second switch is OFF;
the third switch is OFF;
the fourth switch is OFF;
the sixth switch is OFF;
the seventh switch is OFF;
the eighth switch is ON;
the ninth switch is ON;
the tenth switch is OFF;
the twelfth switch is ON;
the first auxiliary power switch is OFF; and
the second auxiliary power switch is ON.

17. The power converter according to claim 14, wherein a sequence of states comprises a fourth state during which:
the first switch is ON;
the second switch is OFF;
the third switch is OFF;
the fourth switch is OFF;
the sixth switch is OFF;
the seventh switch is ON;
the eighth switch is OFF;
the ninth switch is OFF;
the tenth switch is OFF;
the twelfth switch is OFF;
the first auxiliary power switch is ON; and
the second auxiliary power switch is ON.

18. The power converter according to claim 1, wherein the power converter further comprises:
a fifth power switch having a first node which is coupled to the second node of the fourth power switch, and having a second node which is coupled to the first node of the sixth power switch; and
an eleventh power switch having a first node which is coupled to the second node of the tenth power switch, and having a second node which is coupled to the first node of the twelfth power switch.

19. The power converter according to claim 18, wherein a sequence of states comprises a seventh state during which:
the first switch is ON;
the second switch is ON;
the third switch is ON;
the fourth switch is OFF;
the sixth switch is ON;
the seventh switch is OFF;
the eighth switch is OFF;
the ninth switch is OFF;
the tenth switch is ON;
the twelfth switch is OFF;
the fifth power switch is ON; and
the eleventh power switch is OFF.

20. The power converter according to claim 18, wherein a sequence of states comprises an eighth state during which:
the first switch is OFF;
the second switch is OFF;
the third switch is OFF;
the fourth switch is ON;
the sixth switch is OFF;
the seventh switch is ON;
the eighth switch is ON;
the ninth switch is ON;
the tenth switch is OFF;
the twelfth switch is ON;
the fifth power switch is OFF; and
the eleventh power switch is ON.

21. The power converter according to claim 20, wherein:
the power converter comprises a control unit which is configured to operate the power converter within a plurality of different modes of operation to provide a conversion of an input voltage at the input node to an output voltage at the output node in accordance to a conversion ratio; and
the plurality of modes of operations comprises:
a first mode of operation which comprises for an operation cycle a first state followed by a second state followed by [the] a third state and followed by the second state;
a first resonant mode of operation which comprises for an operation cycle the first state followed by the third state;
a second mode of operation which comprises for an operation cycle the first state followed by a fourth state followed by the third state and followed by the fourth state;
a third mode of operation which comprises for an operation cycle the first state followed by a fifth state followed by the third state and followed by a sixth state;
a fourth mode of operation which comprises for an operation cycle the first state followed by a seventh state followed by the third state and followed by an eighth state; and
a second resonant mode of operation which comprises for an operation cycle the seventh state followed by the eighth state, wherein:
during the first state:
the first switch is ON;
the second switch is OFF;
the third switch is OFF;
the fourth switch is ON;
the sixth switch is OFF;
the seventh switch is OFF;
the eighth switch is ON;
the ninth switch is ON;
the tenth switch is OFF; and
the twelfth switch is ON; and
in particular the inductor is magnetized during the first state,
during the second state:
the first switch is OFF;
the second switch is OFF;
the third switch is ON;
the fourth switch is ON;
the sixth switch is ON;
the seventh switch is OFF;
the eighth switch is OFF;
the ninth switch is ON;
the tenth switch is ON; and
the twelfth switch is ON; and
in particular the inductor is demagnetized during the second state,
during the third state:
the first switch is OFF;
the second switch is ON;
the third switch is OFF;

the fourth switch is OFF;
the sixth switch is ON;
the seventh switch is ON;
the eighth switch is OFF;
the ninth switch is OFF;
the tenth switch is ON; and
the twelfth switch is OFF; and
in particular the inductor is magnetized during the third state,
during the fourth state:
the first switch is ON;
the second switch is OFF;
the third switch is OFF;
the fourth switch is OFF;
the sixth switch is OFF;
the seventh switch is ON;
the eighth switch is OFF;
the ninth switch is OFF;
the tenth switch is OFF;
the twelfth switch is OFF;
a first auxiliary power switch is ON, the first auxiliary power switch having a first node which is coupled to the second node of the first power switch, and having a second node which is coupled to the SW node; and a second auxiliary power switch is ON, the second auxiliary power switch having a first node which is coupled to the second node of the seventh power switch, and having a second node which is coupled to the SW node,
during the fifth state:
the first switch is OFF;
the second switch is ON;
the third switch is ON;
the fourth switch is OFF;
the sixth switch is ON;
the seventh switch is ON;
the eighth switch is OFF;
the ninth switch is OFF;
the tenth switch is OFF;
the twelfth switch is OFF;
the first auxiliary power switch is ON; and
the second auxiliary power switch is OFF,
during the sixth state:
the first switch is ON;
the second switch is OFF;
the third switch is OFF;
the fourth switch is OFF;
the sixth switch is OFF;
the seventh switch is OFF;
the eighth switch is ON;
the ninth switch is ON;
the tenth switch is OFF;
the twelfth switch is ON;
the first auxiliary power switch is OFF; and
the second auxiliary power switch is ON, and
during the seventh state:
the first switch is ON;
the second switch is ON;
the third switch is ON;
the fourth switch is OFF;
the sixth switch is ON;
the seventh switch is OFF;
the eighth switch is OFF;
the ninth switch is OFF;
the tenth switch is ON;
the twelfth switch is OFF;
the fifth power switch is ON; and
the eleventh power switch is OFF.

22. The power converter according to claim 21, wherein:
the control unit is configured to operate the power converter in accordance to one or more different sequences of modes as a conversion ratio, which indicates a ratio of an input voltage divided by an output voltage, and which
varies from 0 to 1; and
the one or more sequences of modes comprise at least one of:
a first sequence comprising the first mode of operation for conversion ratios 0 to <$1/3$, the first resonant mode of operation for a conversion ratio 1/3, and the second mode of operation for conversion ratios >1/3 to 1;
a second sequence comprising the first mode of operation for conversion ratios 0 to <1/3, the first resonant mode of operation for a conversion ratio 1/3, and the third mode of operation for conversion ratios >1/3 to 1; or
a third sequence comprising the first mode of operation for conversion ratios 0 to <1/3, the first resonant mode of operation for a conversion ratio 1/3, the fourth mode of operation for conversion ratios >1/3 to <$1/2$, the second resonant mode of operation for a conversion ratio 1/2 and the second mode of operation for conversion ratios >1/2 to 1.

23. A method for operation of the power converter according to claim 1,
wherein the method comprises operating the power converter within a first mode of operation to provide a conversion of an input voltage at the input node to an output voltage at the output node in accordance to a conversion ratio, and
wherein the first mode of operation comprises a sequence of different states of the power converter for an operation cycle of the first mode of operation.

* * * * *